US009568847B2

(12) United States Patent
Fomitchev et al.

(10) Patent No.: US 9,568,847 B2
(45) Date of Patent: Feb. 14, 2017

(54) TONER ADDITIVES COMPRISING COMPOSITE PARTICLES

(71) Applicant: Cabot Corporation, Boston, MA (US)

(72) Inventors: Dmitry Fomitchev, Lexinton, MA (US); Eugene N. Step, Newton, MA (US)

(73) Assignee: Cabot Corporation, Boston, MA (US)

( * ) Notice: Subject to any disclaimer, the term of this patent is extended or adjusted under 35 U.S.C. 154(b) by 52 days.

(21) Appl. No.: 14/350,855

(22) PCT Filed: Oct. 25, 2012

(86) PCT No.: PCT/US2012/061957
§ 371 (c)(1),
(2) Date: Apr. 10, 2014

(87) PCT Pub. No.: WO2013/063291
PCT Pub. Date: May 2, 2013

(65) Prior Publication Data
US 2014/0295341 A1  Oct. 2, 2014

Related U.S. Application Data

(60) Provisional application No. 61/551,525, filed on Oct. 26, 2011.

(51) Int. Cl.
*G03G 9/00* (2006.01)
*G03G 9/08* (2006.01)
*G03G 9/097* (2006.01)

(52) U.S. Cl.
CPC ............ *G03G 9/08* (2013.01); *G03G 9/09716* (2013.01); *G03G 9/09725* (2013.01)

(58) Field of Classification Search
CPC ... G03G 9/08; G03G 9/09725; G03G 9/09716
USPC .......................... 430/108.6, 123.51, 137.21
See application file for complete search history.

(56) References Cited

U.S. PATENT DOCUMENTS

| | | | |
|---|---|---|---|
| 4,476,212 A | 10/1984 | Kakimi | |
| 4,740,443 A | 4/1988 | Nakahara et al. | |
| 4,816,366 A | 3/1989 | Hyosu et al. | |
| 4,833,060 A | 5/1989 | Nair et al. | |
| 4,879,199 A | 11/1989 | Gruber et al. | |
| 4,912,009 A | 3/1990 | Amering et al. | |
| 4,960,669 A | 10/1990 | Mori et al. | |
| 5,135,832 A | 8/1992 | Sacripante et al. | |
| 5,494,949 A | 2/1996 | Kinkel et al. | |
| 5,783,352 A | 7/1998 | Okae et al. | |
| 5,856,055 A | 1/1999 | Ugai et al. | |
| 5,935,751 A | 8/1999 | Matsuoka et al. | |
| 5,939,471 A | 8/1999 | Watanabe et al. | |

(Continued)

FOREIGN PATENT DOCUMENTS

CN  1654489 A  8/2005
EP  0435608 A2  7/1991

(Continued)

OTHER PUBLICATIONS

Schmid, et al., "Synthesis and Characterization of Film-Forming Colloidal Nanocomposite Particles Prepared via Surfactant-Free Aqueous Emulsion Copolymerization", Macromolecules 2009, vol. 42, pp. 3721-3728.

(Continued)

*Primary Examiner* — Thorl Chea

(57) ABSTRACT

Metal-oxide composite particles are used as a toner additive.

9 Claims, 13 Drawing Sheets

(56) References Cited

U.S. PATENT DOCUMENTS

| | | |
|---|---|---|
| 6,331,373 B1 | 12/2001 | Kuramoto et al. |
| 6,395,341 B1 | 5/2002 | Arakawa et al. |
| 6,440,630 B2 | 8/2002 | Isobe et al. |
| 6,447,968 B1 | 9/2002 | Ohno |
| 6,447,969 B1 | 9/2002 | Ito et al. |
| 6,476,098 B1 | 11/2002 | Arakawa et al. |
| 6,482,562 B2 | 11/2002 | Ezenyilimba et al. |
| 6,506,529 B2 | 1/2003 | Uchida et al. |
| 6,589,703 B2 | 7/2003 | Stelter et al. |
| 6,599,631 B2 | 7/2003 | Kambe et al. |
| 6,756,437 B1 | 6/2004 | Xue et al. |
| 6,818,736 B2 | 11/2004 | Arakawa et al. |
| 7,018,768 B2 | 3/2006 | Stulc et al. |
| 7,972,696 B2 | 7/2011 | Sandmeyer et al. |
| 8,399,579 B2 | 3/2013 | Lohmeijer et al. |
| 8,871,844 B2 | 10/2014 | Hashemzadeh |
| 2003/0113541 A1 | 6/2003 | Yamamoto et al. |
| 2005/0238392 A1 | 10/2005 | Okamoto et al. |
| 2007/0075291 A1 | 4/2007 | Paik et al. |
| 2008/0070146 A1 | 3/2008 | Fomitchev et al. |
| 2009/0011352 A1 | 1/2009 | Cooper |
| 2009/0092918 A1 | 4/2009 | Moffat |
| 2009/0149573 A1 | 6/2009 | Venzmer et al. |
| 2010/0104323 A1 | 4/2010 | Toizumi et al. |
| 2010/0160491 A1 | 6/2010 | Armes et al. |
| 2011/0003130 A1 | 1/2011 | Marchet et al. |
| 2011/0070535 A1 | 3/2011 | Hosoya et al. |
| 2011/0112251 A1 | 5/2011 | Langerbeins et al. |
| 2011/0229811 A1 | 9/2011 | Saito et al. |
| 2011/0281973 A1 | 11/2011 | Schubert et al. |
| 2012/0322943 A1 | 12/2012 | Siol et al. |
| 2013/0005881 A1 | 1/2013 | Yang et al. |

FOREIGN PATENT DOCUMENTS

| | | |
|---|---|---|
| EP | 0930623 A1 | 7/1999 |
| EP | 1020488 A2 | 7/2000 |
| EP | 1138733 A2 | 10/2001 |
| EP | 1371672 B1 | 4/2011 |
| JP | 64009467 A | 1/1989 |
| JP | 03197963 A | 8/1991 |
| JP | 03203743 A | 9/1991 |
| JP | 04039669 A | 2/1992 |
| JP | 04273254 A | 9/1992 |
| JP | 04274251 A | 9/1992 |
| JP | 04274266 A | 9/1992 |
| JP | 04291352 A | 10/1992 |
| JP | 04291353 A | 10/1992 |
| JP | 04291354 A | 10/1992 |
| JP | 04308855 A | 10/1992 |
| JP | 05027473 A | 2/1993 |
| JP | 05127416 A | 5/1993 |
| JP | 05127426 A | 5/1993 |
| JP | 05/188634 A | 7/1993 |
| JP | 05186669 A | 7/1993 |
| JP | 05273785 A | 10/1993 |
| JP | 06011883 A | 1/1994 |
| JP | 06043686 A | 2/1994 |
| JP | 06118688 A | 4/1994 |
| JP | 07114212 A | 5/1995 |
| JP | 07219265 A | 8/1995 |
| JP | 07239569 A | 9/1995 |
| JP | 08202071 A | 8/1996 |
| JP | 08292599 A | 11/1996 |
| JP | 09054455 A | 2/1997 |
| JP | 10039536 A | 2/1998 |
| JP | 11338183 A | 12/1999 |
| JP | 2000204355 A | 7/2000 |
| JP | 2002062681 A | 2/2002 |
| JP | 2002131976 A | 5/2002 |
| JP | 2002278150 A | 9/2002 |
| JP | 2002287408 A | 10/2002 |
| JP | 2003147089 A | 5/2003 |
| JP | 2003177571 A | 6/2003 |
| JP | 2003207930 A | 7/2003 |
| JP | 2005082765 A | 3/2005 |
| JP | 2005140965 A | 6/2005 |
| JP | 2005148185 A | 6/2005 |
| JP | 2005173480 A | 6/2005 |
| JP | 2005202131 A | 7/2005 |
| JP | 2005202133 A | 7/2005 |
| JP | 2005338810 A | 12/2005 |
| JP | 2006/251400 | 9/2006 |
| JP | 2007121665 A | 5/2007 |
| JP | 2007264530 A | 10/2007 |
| JP | 2008145749 A | 6/2008 |
| JP | 4189586 B2 | 12/2008 |
| JP | 4432688 B2 | 1/2010 |
| JP | 2010097201 A | 4/2010 |
| JP | 2010102167 A | 5/2010 |
| JP | 2011090168 A | 5/2011 |
| JP | 2012013776 A | 1/2012 |
| JP | 2012014114 A | 1/2012 |
| JP | 2012093630 A | 5/2012 |
| WO | WO 2006/127746 A3 | 11/2006 |
| WO | WO 2008/001097 A1 | 1/2008 |
| WO | WO 2008/052216 A2 | 5/2008 |
| WO | WO 2008/079743 A1 | 7/2008 |
| WO | WO 2008/142383 A1 | 11/2008 |
| WO | WO 2009/009010 A1 | 1/2009 |
| WO | WO 2010/074063 A1 | 7/2010 |
| WO | WO 2010/118961 A1 | 10/2010 |
| WO | WO 2011/045439 A1 | 4/2011 |
| WO | WO 2011/058051 A1 | 5/2011 |
| WO | WO 2011/119265 A1 | 9/2011 |

OTHER PUBLICATIONS

Schmid, et al., "Efficient Preparation of Polystyrene/Silica Colloidal Nanocomposite Particles by Emulsion Polymerization Using a Glycerol-Functionalized Silica Sol", Langmuir 2009, vol. 25, pp. 2486-2494.

Tourinho, et al., "Aqueous Ferrofluids Based on Manganese and Cobalt Ferrites", Journal of Materials Science, vol. 25 (1990), pp. 3249-3254.

Schmid, et al., "A New Highly Efficient Route to Polymer-Silica Colloidal Nancomposite Particles", Adv. Mater. 2008, vol. 20, pp. 3331-3336.

Percy, et al., "Surfactant-Free Synthesis of Colloidal Poly(methyl methacrylate)/Silica Nancomposites in the Absence of Auxiliary Comonomers", Langmuir 2002, vol. 18, pp. 4562-4565.

Percy, et al., "Synthesis and Characterization of Vinyl Polymer—Silica Colloidal Nanocomposites", Langmuir 2000, vol. 16, pp. 6913-6920.

Sacanna, et al., "Oil-in-Water Emulsification Induced by Ellipsoidal Hematite Colloids: Evidence for Hydrolysis-Mediated Self-Assembly", Langmuir 2007, vol. 23, pp. 9974-9982.

Sacanna, et al., "Spontaneous Oil-in-Water Emulsification Induced by Charge-Stabilized Dispersions of Various Inorganic Colloids", Langmuir 2007, vol. 23, pp. 10486-10492.

Sacanna, et al., "Thermodynamically Stable Pickering Emulsions", 2007 Phys. Rev. Left. 98, pp. 158301-1-158301-4.

Nagao, et al., "Synthesis of Anisotropic Polymer Particles with Soap-Free Emulsion Polymerization in the Presence of a Reactive Silane Coupling Agent", Macromolecular Rapid Communications 2008, vol. 29, pp. 1484-1488.

Kraft, et al., "Evolution of Equilibrium Pickering Emulsions—A Matter of Time Scales", J. Phys. Chem. B 2010, vol. 114, pp. 12257-12263.

Kraft, et al., "Conditions for Equilibrium Solid-Stablized Emulsions", J. Phys. Chem. B 2010, vol. 114, pp. 10347-10356.

Fielding, et al., "Synthesis, Characterisation and Applications of Colloidal Nanocomposite Particles", Dept. of Chemistry, The University of Sheffield, Jun. 2012, pp. 1-209.

Lee, et al., "Solid-State Nuclear Magnetic Resonance Studies of Vinyl Polymer/Silica Colloidal Nancomposite Particles", Langumuir 2010, vol. 26(19), pp. 15592-15598.

Ma, et al., "The One-Step Pickering Emulsion Polymerization Route for Synthesizing Organic-Inorganic Nanocomposite Particles", Materials 2010, vol. 3, pp. 1186-1202.

(56) References Cited

OTHER PUBLICATIONS

Fielding, et al., "All-Acrylic Film-Forming Colloidal Polymer/Silica Nancomposite Particles Prepared by Aqueous Emulsion Polymerization", Langmuir 2011, vol. 27, pp. 11129-11144.
Amalvy, et al., "Synthesis and Characterization of Novel Film-Forming Vinyl Polymer/Silica Colloidal Nanocomposites", Langmuir 2001, vol. 17, pp. 4770-4478.
Percy, et al., "Surface Characterization of Vinyl Polymer-Silica Colloidal Nancomposites Using X-Ray Photoelectron Spectroscopy", J. Mater. Chem. 2002, vol. 12, pp. 697-702.
Bourgeat-Lami, et al., "Designing Organic/Inorganic Colloids by Heterophase Polymerization", Macromolecular Symp. 2007, vol. 248, pp. 213-226.
International Search Report and the Written Opinion of the International Searching Authority, or the Declaration of International Patent Application No. PCT/US2012/061957, mailed on Feb. 6, 2013.
Notice of Reasons for Rejection of JP Patent Application No. 2012-102057, mailed on Jun. 10, 2014.
Decision of Final Rejection of JP Patent Application No. 2012-102057, mailed on Mar. 10, 2015.
Notice of Preliminary Rejection of KR Application No. 10-2014-7010788, mailed on Aug. 18, 2014.
Notice of Preliminary Rejection of KR Application No. 10-2014-7010788, mailed on Dec. 10, 2014.

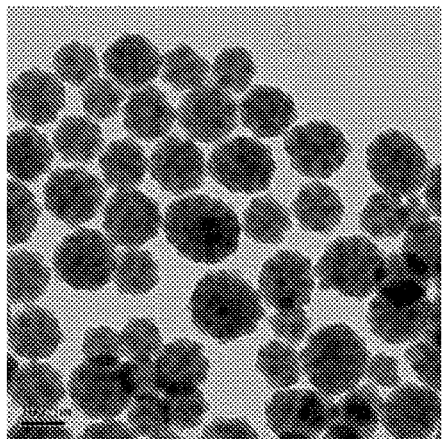
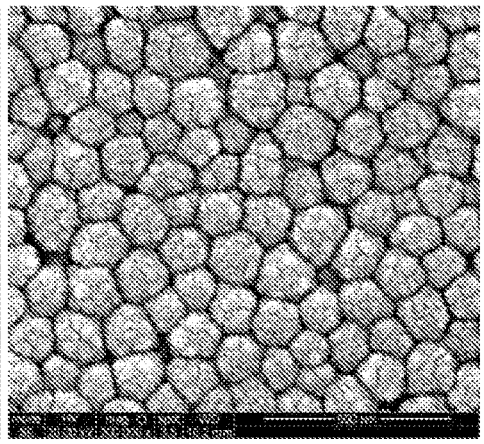
Figure 14A                Figure 14B
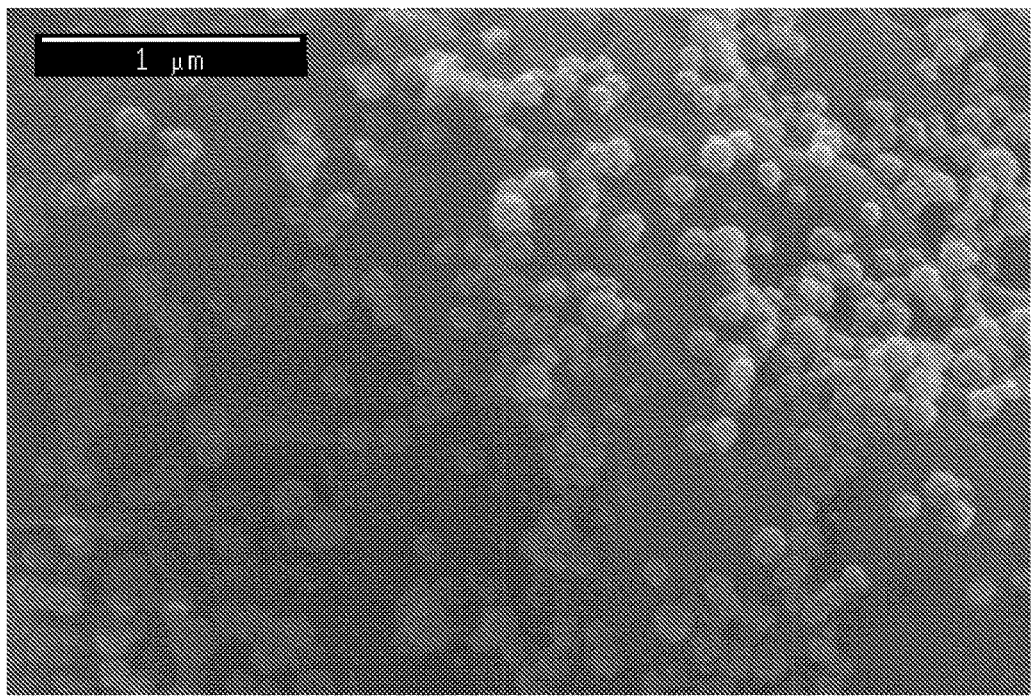
Figure 15A

TONER ADDITIVES COMPRISING COMPOSITE PARTICLES

CROSS REFERENCE TO RELATED APPLICATIONS

This application is a §371 national phase application of and claims priority to International Patent Application No. PCT/US2012/061957, filed on Oct. 25, 2012, which claims priority to U.S. Provisional Patent Application No. 61/551,525 filed on Oct. 26, 2011.

BACKGROUND OF THE INVENTION

1. Field of the Invention

This invention relates to the use of metal oxide-polymer composite particles as external additives for electrophotographic toner.

2. Description of the Related Art

Electrophotographic image formation comprises uniform charging of the surface of a photoreceptor drum or belt; exposure of the photoreceptor surface to light and formation on the photoreceptor surface of a charge pattern, i.e., a latent image, that mirrors the information to be transferred into a real image; developing the latent image with electrostatically charged toner particles comprising a colorant dispersed in a binder resin; transferring the developed toner onto a substrate, e.g. paper; fusing the image onto a substrate; and preparing the photoreceptor surface for the next cycle by erasing the residual electrostatic charges and cleaning the remaining toner particles.

Toners for use in electrophotography and electrostatic printing include a binder resin and a colorant, and may further include a charge control agent, an offset-preventing agent, and other additives. External toner additives such as metal oxide particles are often combined with toner particles in order to improve selected properties of the toner particles, including fluidity, transferability, fixability, and cleaning properties. A variety of external additives may be used in a single toner composition to enhance different properties of the toner. For example, some additives may be selected to improve chargeability, i.e., tribocharge. Others may be selected to improve cleaning performance or humidity resistance. Of course, it is preferable that a toner additive optimized for one function is not detrimental to the functions imparted by the various additives.

One function imparted by the toner additives is spacing and maintenance of fluidity. If the toner particles adhere to one another, they will not flow as well; additives serve to reduce the cohesion of the toner powder. The additive particles tend to be hard. The toner, on the other hand, is formed from softer polymers and is a coherent powder. The resulting agglomeration of toner particles is detrimental to both the operation of the electrophotography apparatus and to the print quality. Indeed, as manufacturers have sought to reduce the energy required to produce a printed page, they have turned to softer polymers (i.e., lower Tg polymers) to reduce the amount of heat required to fuse the toner to a substrate. However, the hard additive particles can become embedded in the soft toner particles, reducing the effectiveness of the additive. Increasing the size of the additive particle reduces embedding; however, the larger particles are also heavier and exhibit a higher rate of drop-off from the toner particle. Of course, additive particles that drop off the toner cannot serve their function as part of the toner composition. Thus, it is desirable to have a toner additive that serves as a spacer between toner particles that both exhibits limited embedding in the toner particles and limited drop-off without adverse impact on the tribocharge characteristics of the toner.

SUMMARY OF THE INVENTION

It has been found that the use of metal oxide-polymer composites comprising hydrophobized metal oxides can improve additive drop-off performance.

In one aspect, a toner composition comprises toner particles mixed with a powder comprising metal oxide-polymer composite particles comprising metal oxide particles and a polymer. The metal oxide particles are modified with a first hydrophobizing agent via which the metal oxide particles are covalently attached to the polymer, and a portion of the metal oxide particles are partially or fully embedded within the polymer portion of the metal oxide-polymer composite particles. Alternatively or in addition, a toner composition comprises toner particles mixed with a powder comprising metal oxide-polymer composite particles comprising metal oxide particles and a polymer, and the metal oxide particles are modified with a first hydrophobizing agent via which the metal oxide particles are covalently attached to the polymer and a second hydrophobizing agent.

For either or both of these toner compositions, the first hydrophobizing agent may have the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10. For example, the first hydrophobizing agent may be methacryloxypropyltrimethoxysilane.

The metal oxide-polymer composite particles may have a volume average diameter from about 20 nm to about 450 nm. If it has not been modified already, the surface of the metal oxide particles may be modified with a second hydrophobizing agent. In either case, the second hydrophobizing agent may be selected from silazane compounds, siloxane compounds, silane compounds, and silicone fluids having a number average molecular weight of at most 500. The first hydrophobizing agent may have a molecular weight less than 300.

For any of these toner compositions, the metal oxide-polymer composite particles may have an average relative trough area (C−S)/S of from 0 to about 1, where C is the area within a convex hull bounding and enclosing the particle and S is the cross-sectional area of the particle. A portion of the metal oxide particles may be partially or fully embedded within the polymer portion of the metal oxide-polymer composite particles. For any of these toner compositions, the metal oxide-polymer composite particles may have an average roughness $P^2/4\pi S$ from 1 to about 3, where P is a perimeter of a cross-section of a metal oxide-polymer composite particle and S is the cross-sectional area of the particle and where both P and S are determined from transmission electron micrographs.

For any of these toner compositions, the metal oxide-polymer composite particles may be treated with a third hydrophobizing agent, for example, an alkylhalosilane or a silicone fluid having a number average molecular weight greater than 500. The polymer of the metal oxide-polymer composite particles may include polymers of styrene, unsubstituted or substituted acrylates or methacrylates, olefins, vinyl esters, and acrylonitrile and copolymers and mixtures of the above. The metal oxide-polymer composite particles may be distributed on the surface of the toner particles.

When the metal oxide-polymer composite particles are combined with of polyester chemical toner particles having a particle size from 8-12 μm to form a toner having 4 wt % metal oxide-polymer composite particles and the toner combined with silicone coated Cu—Zn ferrite carrier having a particle size from 60-90 μm to form a mixture having 2 wt % toner and the mixture agitated rhythmically in a container with a fill factor from about 70% to about 90% in a three-dimensional mixer within a volume about 6 to about 8 times the volume of the container for 10 minutes at a frequency from about 50 to about 70 cycles/min, their diameter increases by less than 25%.

A specific density of the metal oxide-polymer composite particles when measured by helium pycnometry may be from about 30% to about 90% of the specific density of the metal oxide. The moisture content of the metal oxide-polymer composite particles may be from 0 wt % to about 10 wt % when measured after equilibration at 50% relative humidity and 25° C. at about 1 atm pressure. The toner composition may include about 0.5 to about 7 weight percent of the metal-oxide polymer composite particles.

The polymer may comprises a polymer or copolymer of the first hydrophobizing agent. The metal oxide particles may comprise precipitated, fumed, or colloidal metal oxide particles, for example, silica, titania, or both. The metal oxide-polymer composite particles may have an aspect ratio of about 0.8 to about 1.2. From about 5% to about 95% of the length of the metal oxide particles may be exposed at the surface of the metal oxide-polymer composite particles.

In another aspect, a method of making a composite particle includes preparing an aqueous dispersion comprising metal oxide particles and a first hydrophobizing agent, wherein the first hydrophobizing agent becomes chemically attached to the metal oxide particles; adding a polymerization initiator to the aqueous dispersion to form metal oxide-polymer composite particles having silica particles at their surfaces; and treating available surfaces of the metal oxide particles with a second hydrophobizing agent, wherein treating may be performed before preparing or after formation of the metal oxide-polymer composite particles.

The method may further include drying the metal oxide-polymer composite particles, wherein, when treating is performed after formation of the metal oxide-polymer composite particles, drying may be performed before or after treating. The initiator may be an oil-soluble initiator. The second hydrophobizing agent may be selected from silazane compounds, siloxane compounds, silane compounds, and silicone fluids having a number average molecular weight of at most 500.

The first hydrophobizing agent may have the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10. The dispersion may further include one or more of styrene, a substituted or unsubstituted acrylate or methacrylate monomer, an olefin monomer, a vinyl ester, or acrylonitrile. The method may further include drying the metal oxide-polymer composite particles to form a powder, which powder may be milled.

In another aspect, a method of making a composite particle includes preparing an aqueous dispersion comprising fumed metal oxide particles and a first hydrophobizing agent, wherein the first hydrophobizing agent becomes chemically attached to the metal oxide particles; and adding a polymerization initiator to the aqueous dispersion to form metal oxide-polymer composite particles having fumed metal oxide particles at their surfaces.

The method may further include treating available surfaces of the fumed metal oxide particles with a second hydrophobizing agent, wherein treating may be performed before preparing or after formation of the metal oxide-polymer composite particles. The second hydrophobizing agent may be selected from silazane compounds, siloxane compounds, silane compounds, and silicone fluids having a number average molecular weight of at most 500. The method may further include drying the metal oxide-polymer composite particles to form a powder, which powder may be milled.

The first hydrophobizing agent may have the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10. The dispersion may further include one or more of styrene, a substituted or unsubstituted acrylate or methacrylate monomer, an olefin monomer, a vinyl ester, or acrylonitrile.

An another aspect, a method of producing a metal oxide-polymer composite particle includes preparing an emulsion comprising micelles comprising a first hydrophobizing agent in an aqueous medium, wherein metal oxide particles are distributed at least at a surface of the micelles and wherein the first hydrophobizing agent has the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10; incubating the dispersion for a predetermined amount of time; adding an oil soluble radical initiator to the emulsion; allowing a chemical group of the first hydrophobizing agent to become part of a polymer, thereby forming metal oxide-polymer composite particles; and drying the metal oxide-polymer composite particles to obtain a powder.

The method may further include treating the metal oxide-polymer composite particles with a second hydrophobizing agent, wherein treating may be performed before preparing or after formation of the metal oxide-polymer composite particles. The second hydrophobizing agent may be selected from silazane compounds, siloxane compounds, silane compounds, and silicone fluids having a number average molecular weight of at most 500. The method may further include milling the metal oxide-polymer composite particles. The emulsion may further include one or more of styrene, a substituted or unsubstituted acrylate or methacrylate monomer, an olefin monomer, a vinyl ester, or acrylonitrile.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

FIGS. 14A and B are transmission and scanning electron micrographs, respectively, of metal oxide-polymer composite particles produced according to an embodiment of the invention.

DETAILED DESCRIPTION OF THE INVENTION

Figure 1:
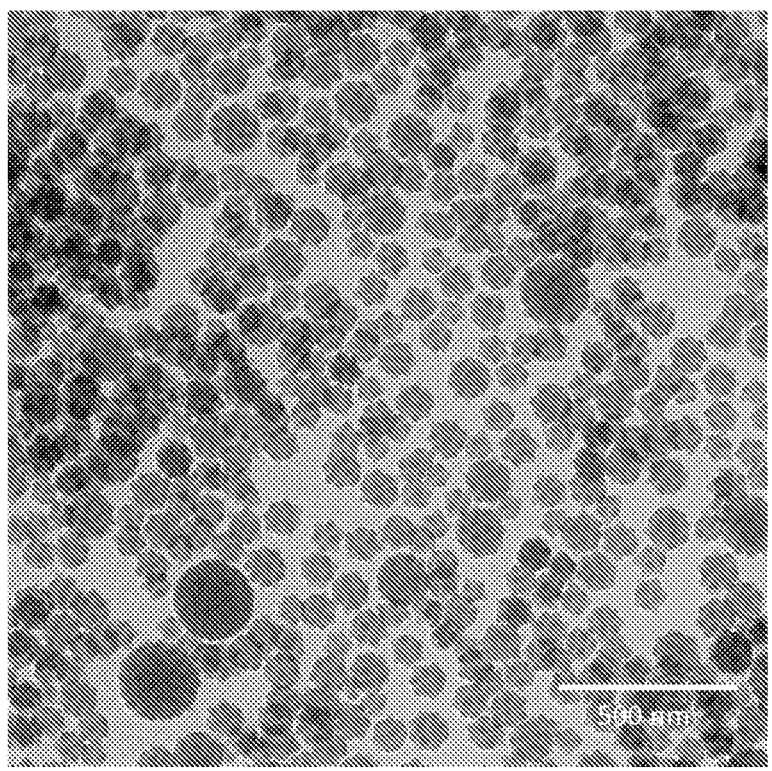
FIGS. 1 and 2 are transmission electron micrographs of metal oxide-polymer composite particles produced according to an embodiment of the invention.

In one embodiment, a toner composition includes toner particles mixed with a powder comprising metal oxide-polymer composite particles comprising metal oxide particles and a polymer. The surface of the metal oxide particles is modified with a first hydrophobizing agent via which the metal oxide particles are covalently attached to the polymer. A portion of the metal oxide particles are partially or fully embedded within the polymer portion of the metal oxide-polymer composite particles. In another embodiment, the toner composition includes toner particles mixed with a powder comprising metal oxide-polymer composite particles comprising metal oxide particles and a polymer, and the metal oxide particles are modified with a first hydrophobizing agent via which the metal oxide particles are covalently attached to the polymer and a second hydrophobizing agent.

Metal oxide particles appropriate for use with the present invention include silica, alumina, ceria, molybdenum oxide, titania, zirconia, zinc oxide, iron oxides, including but not limited to magnetite ($Fe_3O_4$) and various forms of $Fe_2O_3$, niobium oxide, vanadium oxide, tungsten oxide, tin oxide, or mixtures or mixed oxides of any two or more of these. For use as external toner additives, the metal oxide particles will typically include at least one of silica, alumina, and titania.

Suitable particles include but are not limited to precipitated, colloidal, and pyrogenic metal oxide particles. The metal oxide particles may be produced utilizing techniques known to those skilled in the art. Exemplary commercially available titania particles include STR100N and STR100A titanium dioxide from Sakai Chemical.

Precipitated metal oxide particles may be manufactured utilizing conventional techniques and are often formed by the coagulation of the desired particles from an aqueous medium under the influence of high salt concentrations, acids, or other coagulants. The metal oxide particles are filtered, washed, dried, and separated from residues of other reaction products by conventional techniques known to those skilled in the art. Precipitated particles are often aggregated in the sense that numerous primary particles coagulate to one another to form a somewhat spherical aggregated cluster. Non-limiting examples of commercially available precipitated metal oxides include Hi-Sil® products from PPG Industries, Inc. and SIPERNAT® products available from Degussa Corporation.

Alternative metal oxide morphologies may be obtained using the methods disclosed in U.S. Pat. Nos. 4,755,368, 6,551,567, and 6,702,994, US Patent Publication No. 20110244387, in Mueller, et al., "Nanoparticle synthesis at high production rates by flame spray pyrolysis," *Chemical Engineering Science,* 58: 1969 (2003), and in Naito, et al., "New Submicron Silica Produced by the Fumed Process," published in NIP 28: International Conference on Digital Printing Technologies and Digital Fabrication 2012, 2012, p. 179-182, the contents of all of which are incorporated by reference. These methods typically result in metal oxide particles with low structure and surface area. Many of these particles are pyrogenic, that is, they are produced in a flame. Other methods of producing pyrogenic particles are disclosed, for example, in Kodas and Hampden-Smith, *Aerosol Processing of Materials,* Wiley-VCH, 1998. Suitable pyrogenic metal oxides for use in the composite particles provided herein are small, e.g., with volume average diameters less than 100 nm.

Colloidal metal oxide particles are often non-aggregated, individually discrete (primary) particles, which typically are spherical or nearly spherical in shape, but can have other shapes (e.g., shapes with generally elliptical, square, or rectangular cross-sections). Colloidal metal oxides are commercially available or can be prepared by known methods from various starting materials (e.g., wet-process type metal oxides). Colloidal metal oxide particles are typically fabricated in a manner similar to precipitated metal oxide particles (i.e., they are coagulated from an aqueous medium) but remain dispersed in a liquid medium (often water alone or with a co-solvent and/or stabilizing agent). Metal oxide particles can be prepared, for example, from silicic acid derived from an alkali silicate solution having a pH of about 9 to about 11, wherein the silicate anions undergo polymerization to produce discrete silica particles having the desired average particle size in the form of an aqueous dispersion. Typically, the colloidal metal oxide starting material will be available as a sol, which is a dispersion of colloidal metal oxide in a suitable solvent, most often water alone or with a co-solvent and/or stabilizing agent. See, e.g., Stoeber, et al., "Controlled Growth of Monodisperse Silica Spheres in the Micron Size Range," *Journal of Colloid and Interface Science,* 26, 1968, pp. 62-69, Akitoshi Yoshida, Silica Nucleation, Polymerization, and Growth Preparation of Monodispersed Sols, in *Colloidal Silica Fundamentals and Applications,* pp 47-56 (H. E. Bergna & W. O. Roberts, eds., CRC Press: Boca Raton, Fla., 2006), and Iler, R. K., *The Chemistry of Silica,* p 866 (John Wiley & Sons: New York, 1979). Non-limiting examples of commercially available colloidal metal oxides suitable for use in the invention include SNOWTEX® products from Nissan Chemical, LUDOX® products available from W.R. Grace & Co., NexSil™ and NexSil A™ series products available from Nyacol Nanotechnologies, Inc., Quartron™ products available from Fuso Chemical, and Levasil® products available from AkzoNobel.

Colloidal metal oxide particles may have a primary particle size from about 5 to about 100 nm, for example, from about 5 to about 10 nm, from about 10 to about 20 nm, from about 20 nm to about 30 nm, from about 30 to about 50 nm, or from about 50 to about 70 nm. The metal oxide particles may be spherical or non-spherical. For example, the aspect ratio of the metal oxide particles may be from about 1.5 to about 3, for example, from about 1.5 to about 1.8, from about 1.8 to about 2.1, from about 2.1 to about 2.5, from about 2.5 to about 2.8, or from about 2.8 to about 3. Particle size may be measured by dynamic light scattering.

The metal oxide particles are treated with a first hydrophobizing agent. The first hydrophobizing agent is bifunctional, including a first reactive group that can covalently attached to the metal oxide particle and a second reactive group that can be incorporated into the polymer of the metal oxide-polymer composite particle. In certain implementations, the first hydrophobizing agent will have a molecular weight less than 300. "Hydrophobic" metal oxide particles, as the term is used herein, encompass varying levels or degrees of hydrophobicity. The degree of hydrophobicity imparted to the metal oxide particles will vary depending upon the type and amount of treating agent used. Hydrophobic metal oxide particles for use with the invention may, for example, have from about 15% to about 85% of the available metal oxide surface hydroxyl groups reacted, for example, from about 25% to about 75% or from about 40% to about 65% of the available metal oxide surface hydroxyl groups reacted or a percentage in any range bounded by any two of the above endpoints. Where a second hydrophobizing agent is used, as discussed below, it will react with a portion of the surface hydroxyl groups of the metal oxide.

The first hydrophobizing agent may have the formula $[R^3{}_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester or methacrylate ester group, with the proviso that when Q is unsubstituted or substituted vinyl, n=2-10. Exemplary agents suitable for use as the first hydrophobizing agent include but are not limited to (3-acryloxypropyl)trimethoxysilane, (3-acryloxypropyl)triethoxysilane, methacryloxypropyltrimethoxysilane, methacryloxypropyltriethoxysilane, methacryloxymethyltrimethoxysilane, methacryloxymethyltriethoxysilane, (3-acryloxypropyl)methyldimethoxysilane, methacryloxypropylmethyldimethoxysilane, methacryloxypropyldimethylethoxysilane, 3-butenyltrimethoxysilane, 3-butenyltriethoxysilane, 4-pentenyltriethoxysilane, 4-pentenyltrimethoxysilane, 5-hexenetrimethoxysilane, 5-hexenemethyldimethoxysilane, and methacryloxypropyldimethylmethoxysilane. Where the metal oxide particle is not silica, di- or tri-functional silanes should be used (i.e., x should be 2 or 3).

The metal oxide particles may additionally be treated with a second hydrophobizing agent, either before or after treatment with the first hydrophobizing agent or after formation of the metal oxide-polymer composite particle, in which case only the exposed surfaces of the metal oxide particles are treated. Preferred agents for use as the second hydrophobizing agent are silazane compounds, siloxane compounds, and silane compounds, and silicone fluids having some solubility in water, with or without a co-solvent. Preferably, silicone fluids for use as the second hydrophobizing agent have a number average molecular weight of at most 500. Examples of silane compounds include alkylsilanes, and alkoxysilanes. Alkoxysilanes include compounds having the general formula: $R'_xSi(OR'')_{4-x}$ wherein R' is selected from the group consisting of $C_1$-$C_{30}$ branched and straight chain alkyl, alkenyl, $C_3$-$C_{10}$ cycloalkyl, and $C_6$-$C_{10}$ aryl, R'' is $C_1$-$C_{10}$ branched or straight chain alkyl, and x is an integer of 1-3. Where the metal oxide particle does not include silica, the second hydrophobizing agent should be a di- or tri-functional silane or a siloxane or silicone fluid.

Non-limiting examples of silane compounds that may be employed as the second hydrophobizing agent as taught herein include trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-octyltriethoxysilane, n-hexadecyltrimethoxysilane, n-octadecyltrimethoxysilane, and the like. Non-limiting examples of useful siloxane compounds include octamethylcyclotetrasiloxane, hexamethylcyclotrisiloxane, and the like. Non-limiting examples of useful silazane compounds include hexamethyldisilazane (HMDZ), hexamethylcyclotrisilazane, octamethylcyclotetrasilazane, and the like. For example, HMDZ may be used to cap unreacted hydroxyl groups on the surface of the metal oxide particle. Exemplary hydrophobicity-imparting agents also include hexamethyldisilazane, isobutylrimethoxysilane, octyltrimethoxysilane and cyclic silazanes such as those disclosed in U.S. Pat. No. 5,989,768. Such cyclic silazanes are represented by the formula

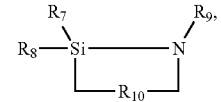

where wherein $R_7$ and $R_8$ are independently selected from the group consisting of: hydrogen, halogen, alkyl, alkoxy, aryl, and aryloxy; $R_9$ is selected from the group consisting of: hydrogen, $(CH_2)_rCH_3$, wherein r is an integer between 0 and 3, $C(O)(CH_2)_rCH_3$, wherein r is an integer between 0 and 3, $C(O)NH_2$; $C(O)NH(CH_2)_rCH_3$, wherein r is an integer between 0 and 3, and $C(O)N[(CH_2)_rCH_3](CH_2)_sCH_3$, wherein r and s are integers between 0 and 3; and $R_{10}$ is represented by the formula $[(CH_2)_a(CHX)_b(CYZ)_c]$, wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 2 and 6. The cyclic silazane may be a five or six member ring having the formula

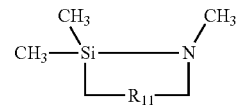

wherein $R_{11}$ is represented by the formula $[(CH_2)_a(CHX)_b(CYZ)_c]$, wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 3 and 4.

Suitable silicone fluids for use as the second treatment agent include both non-functionalized silicone fluids and functionalized silicone fluids. Depending on the conditions used to surface treat the metal oxide particles and the particular silicone fluid employed, the silicone fluid may be present as a non-covalently bonded coating or may be covalently bonded to the surface of the metal oxide particles. Non-limiting examples of useful non-functionalized silicone fluids include polydimethylsiloxanes, polydiethylsiloxanes, phenylmethylsiloxane copolymers, fluoroalkylsiloxane copolymers, diphenylsiloxane-dimethylsiloxane copolymers, phenylmethylsiloxane-dimethylsiloxane copolymers, phenylmethylsiloxane-diphenylsiloxane copolymers, methylhydrosiloxane-dimethylsiloxane copolymers, polyalkylene oxide modified silicones, and the like. Functionalized silicone fluids can comprise, for example, functional groups selected from the group consisting of vinyl, hydride, silanol, amino, and epoxy. The functional groups may be bonded directly to the silicone polymer backbone or may be bonded through intermediary alkyl, alkenyl, or aryl groups.

Alternatively or in addition, the dimethylsiloxane co-polymers disclosed in U.S. Patent Publication No. 20110244382, the contents of which are incorporated herein by reference, may be used to treat the metal oxide particles. Exemplary dimethylsiloxane co-polymers include co-polymers of the formula:

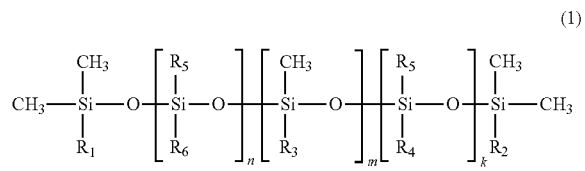

(1)

wherein $R_1$ is —H, —$CH_3$, $R_2$=—H, —$CH_3$, $R_3$=—$CH_3$, —$CH_2CH_3$, —$CH_2CH_2CH_3$, $CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group, $R_4$ is —$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group, $R_5$ is —$CH_3$, —$CH_2CH_3$, —$CH_2Ar$, —$CH_2CH_2Ar$, or —Ar, $R_6$ is —H, —OH, —$OCH_3$, or —$OCH_2CH_3$, Ar is unsubstituted phenyl or phenyl substituted with one or more methyl, halogen, ethyl, trifluoromethyl, pentafluoroethyl, or $CH_2CF_3$ groups, n, m, and k are integer numbers, n≥1, m≥0, and k≥0, and wherein the co-polymer has a molecular weight from 208 to about 20,000.

Alternatively or in addition, the second hydrophobizing agent may be a charge modifying agent. Any of the charge modifying agents disclosed in U.S. Patent Publication No. 2010/0009280, the contents of which are incorporated herein by reference, may be employed herein. Exemplary charge modifying agents include but are not limited to 3-(2,4-dinitrophenylamino) propyltriethoxsilane (DNPS), 3,5-dinitrobenzamido-n-propyltriethoxysilane, 3-(triethoxysilylpropyl)-p-nitrobenzamide (TESPNBA), pentafluorophenyltriethoxysilane (PFPTES), and 2-(4-chlorosulfonylphenyl)ethyltrimethoxysilane (CSPES). Charge modifying agents including nitro groups should be used to post-treat the metal oxide particles after the co-polymer, as the hydride groups may reduce the nitro groups.

Alternatively or in addition to the second hydrophobizing agent, the metal oxide particles may be treated with a third hydrophobizing agent following formation of the metal oxide-polymer composite. The third treating agent can be an alkylhalosilane or a silicone fluid having a number average molecular weight greater than 500. Alkylhalosilanes include compounds having the general formula $R'_xSiR''_yZ_{4-x-y}$, where R' and R" are as defined above, Z is a halogen, preferably chlorine, and y is 1, 2, or 3.

Depending on the interaction between the second hydrophobizing agent (when used after formation of the metal oxide-polymer particle) and/or the third hydrophobizing agent and the polymer component of the metal oxide-polymer composite particles, these agents may also surface treat the exposed polymer surface of the metal oxide-polymer composite particles.

The polymer employed in the metal oxide-polymer composite particles may be the same or different as the polymer of the first hydrophobizing agent. That is, where the first hydrophobizing agent includes a polymerizable group, the same material may simply be used to form the polymer. In certain implementations, the polymer of the first hydrophobizing agent is not a polyether. Alternatively or in addition, the polymer of the first hydrophobizing agent is an acrylate or methacrylate polymer. Alternatively or in addition, a different monomer or a cross-linking agent that can copolymerize with the terminal group on the first hydrophobizing agent may be employed. Suitable monomers that may be used to produce the metal oxide-polymer composite particles include substituted and unsubstituted vinyl and acrylate (including methacrylate) monomers and other monomers that polymerize by radical polymerization. Exemplary monomers include styrene, acrylates and methacrylates, olefins, vinyl esters, and acrylonitrile and are easily available to those of skill in the art, for example, from Sigma-Aldrich (Milwaukee, Wis.). Such monomers may be used by themselves, in mixtures to form copolymers, or in conjunction with cross-linking agents. Exemplary cross-linking agents include divinyl terminated versions of the first hydrophobizing agent (e.g., with the silane replaced by a vinyl group) or other well-known vinyl cross-linking agents, such as divinyl benzene and ethylene glycol dimethacrylate. Alternatively or in addition, the co-monomer or cross-linking agent may react with the silane. For example, silanol-terminated siloxane polymers or the copolymer of Formula (I) above may be used in conjunction with the first hydrophobizing agent. The co-monomer or cross-linking agent may be added at the same time or at a different time than the first hydrophobizing agent. The amount of cross-linking agent may be adjusted to control the degree of cross-linking in the final polymer.

The metal oxide-polymer composite particles are made by creating an emulsion of an organic phase comprising the first hydrophobizing agent and optional monomer and an aqueous phase in which the metal oxide particles are primarily disposed at the interface between the two fluid phases. Polymerization of the polymerizable species in the organic phase results in the composite particles. In one exemplary procedure, an emulsion is prepared with the first hydrophobizing agent and optional co-monomers and cross-linking agents and metal oxide particles at a ratio of about 1.5 to 8.0 by mass (polymerizable species: metal oxide) in aqueous media, e.g., water with an optional co-solvent such as an alcohol, e.g., isopropyl alcohol. The total amount of metal oxide particles and polymerizable species in the emulsion may be from about 5 wt % to about 25 wt %, for example from 5 wt % to about 15 wt %, from about 15 wt % to about 22 wt %, or from about 18 wt % to about 25 wt %. The pH is optionally brought to about 8.0-10 and the dispersion is stirred to form an emulsion (typically 1-3 hours) while the temperature is maintained at 25-60° C. Following stirring, an initiator is introduced as a solution in ethanol, acetone, or other water-miscible solvent at a level of about 1 to about 4 wt % with respect to monomer. Suitable initiators include but are not limited to oil soluble azo or peroxide thermal initiators such as 2,2'-azobis(2-methylpropionitrile) (AIBN), benzoyl peroxide, tert-butyl peracetate, and cyclohexanone peroxide. A variety of suitable initiators are available from Wako Pure Chemical Industries, Ltd. (Osaka, Japan). The initiator may be dissolved in the monomer prior to the introduction of the metal oxide. The resulting solution is incubated at 65-95° C. with stirring for 4-6 hours. The resulting slurry is dried at 100-130° C. overnight and the remaining solid is milled to produce a powder. Where a second hydrophobizing agent is added after formation of the metal oxide-polymer composite, it may be introduced before the drying step. For example, the second hydrophobizing agent may be added and the slurry stirred for an additional 2-4 hours with incubation at 60-75° C.

One of skill in the art will recognize that the amount of metal oxide exposed at the surface of the metal oxide-polymer composite will vary depending on the amount of time the metal oxide particles are exposed to the first hydrophobizing agent before the initiator is activated. The metal oxide particles in the emulsion are distributed at the surface of micelles, or droplets, comprising the first hydrophobizing agent. Without being bound by any particular theory, it is believed that, as the first hydrophobizing agent adsorbs onto and becomes attached to the metal oxide surface, that the metal oxide particle becomes more hydrophobic and gradually exposes a higher proportion of its surface to the interior of the droplet of first hydrophobizing agent, i.e., by sinking into the droplet to expose less surface to the aqueous continuous phase of the emulsion. Once polymerization is complete, the metal oxide particles are fixed in place. If a second hydrophobizing agent is used, the degree of treatment provides an additional handle for controlling the exposure of the metal oxide particle at the surface of the metal oxide-polymer composite. One of skill in the art will recognize that variables such the pH of the aqueous phase of the emulsion and the incubation temperature will influence the morphology of the composite particles. In certain embodiments, the composite particles have metal oxide particles disposed within the composite particles, i.e., completely within the polymer phase, as well as protruding from the surface. In these embodiments, the metal oxide particles contribute to mechanical reinforcement of the composite particles, increasing their compressive strength.

The degree of surface treatment of the metal oxide with the first hydrophobizing agent may be controlled by adjusting the pH and temperature of the initial solution. The rate of adsorption of the first hydrophobizing agent onto the metal oxide particles (which adsorption is followed by the formation of a siloxane bond between the surface and the agent) may also be controlled by the choice of the leaving group on the silane, e.g., ethoxy tends to hydrolyze more slowly than methoxy.

The degree of surface treatment also influences the amount of the surface of the metal oxide particles that is exposed at the surface of the metal oxide-polymer composite particles. The mixture of the first hydrophobizing agent and an aqueous solution forms an emulsion that is stabilized by the migration of metal oxide particles to the surface of droplets of the first hydrophobizing agent. As the silane hydrolyzes and adsorbs onto the metal oxide surface, the originally hydrophilic surface becomes more hydrophobic and thus more compatible with the organic phase, gradually migrating from the aqueous side of the organic/aqueous interface to the organic side. Thus, controlling the degree of surface treatment of the metal oxide before polymerization also controls the amount of metal oxide at the surface of the resulting metal oxide-polymer composite particle.

At least a portion of the metal oxide particles in the composite particle may be entirely embedded within the polymer portion of the composite particle. Alternatively or in addition, at least a portion of the metal oxide particles may be partially embedded in the polymer portion of the composite particles; i.e., portions of the metal oxide particles project into and out from the polymer matrix. In certain embodiments, metal oxide particles exposed at the surface of the composite may have about 0% to about 95%, for example, about 5% to about 90%, about 10% to about 20%, about 20% to about 30%, to about 70%, about 70% to about 80%, or about 80% to about 90% of their length projecting from the surface of the metal oxide-polymer composite particles, as measured on metal oxide particles observable by electron microscopy of at least 200 metal oxide-polymer composite particles.

The metal oxide-polymer composite particles will typically be round. It will be understood that the particles need not be spherical but will typically have a "bumpy" surface depending on degree to which the metal oxide particles are exposed at the surface of the composite particle. The metal oxide-polymer composite particles may have an aspect ratio of about 0.8 to about 1.2, for example, about 0.85 to about 0.90, about 0.90 to about 0.95, about 0.95 to about 1.0, about 1.0 to about 1.05, about 1.05 to about 1.1, or about 1.1 to about 1.15.

The degree of "bumpiness," or roughness, of the metal oxide-polymer composite particles may be determined by TEM (transmission electron microscope) evaluation. Conventional image analysis software is used to define a perimeter P of a cross-section of the particle. The same software is used to calculate particle cross-sectional area S. These measurements are made for multiple particles on multiple TEM images. Particle Roughness is equal to $P^2/4\pi S$ (John C. Russ, *The Image Processing Handbook*, CRC Press, $4^{th}$ edition, 2002). The roughness of an ideal spherical particle is 1.0. The roughness of a typical non-aggregated colloidal silica is about 1.3. The average roughness of the metal oxide-polymer composite particles may be from 1 to about 3, for example, from 1 to about 1.5, from about 1.5 to about 2, from about 2 to about 2.5, or from about 2.5 to about 3, e.g. from about 1.1 to about 1.5 or from about 1.2 to about 1.4. The average roughness is measured using images of at least 200 particles, preferably at least 500 particles.

Alternatively or in addition, the same image analysis software may be used to construct a convex hull about the image of the particle and determine the area C inside the hull, termed "hull area". A convex hull is a curved convex bounding surface enclosing the entire particle. It is generated by moving a pair of parallel lines until they just touch the exterior of the particle image. The angle of the parallel lines is then changed and the process repeated until the entire path of the convex hull is defined. The relative trough area (RTA), is defined by $(C-S)/S$, where S is the particle cross-sectional area described in connection with roughness. The value of RTA increases with increasing protrusions from the surface. The RTA of a perfect sphere is 0. The RTA of a typical non-aggregated colloidal silica is about 0.01. The average RTA of the metal oxide-polymer composite particles may be from 0 to about 1, for example from 0 to about 0.1, e.g., about 0.01 to about 0.02, about 0.02 to about 0.03, about 0.03 to about 0.04, about 0.04 to about 0.05, about 0.05 to about 0.06, 0.06 to about 0.07, about 0.07 to about 0.08, about 0.08 to about 0.09, or about 0.09 to about 0.1. The average RTA is measured using images of at least 200 particles. Of course, using more particle images will provide greater sensitivity and facilitate distinguishing different particle morphologies.

The metal oxide-polymer composite particles may have an average diameter (volume average) of about 20 nm to about 500 nm. Where the aspect ratio is not unity, the diameter refers to the largest diameter of the particle. For example, the volume average diameter of the metal oxide-polymer composite particles may be about 20 nm to about 50 nm, 50 nm to about 100 nm, about 100 nm to about 150 nm, about 150 nm to about 200 nm, about 200 nm to about 250 nm, about 250 nm to about 300 nm, about 300 nm to about 350 nm, about 350 nm to about 400 nm, about 400 nm to about 450 nm, or about 450 to about 500 nm.

The metal oxide-polymer composite particles preferably have a density less than the specific density of the metal oxide itself (e.g., silica has a specific density of 2.2 g/cm$^3$, titanium dioxide has a density of 3.6 g/cm$^3$). For example, the specific density of the composite particles may be from about 30% to about 35%, about 35% to about 40%, 40% to about 45%, about 45% to about 50%, about 50% to about 55%, about 55% to about 60%, about 60% to about 63%, from about 63% to about 67%, from about 67% to about 70%, from about 70% to about 73%, from about 73% to about 76%, from about 76% to about 79%, from about 79% to about 82%, from about 82% to about 85%, or from about 85% to about 90% of the specific density of the metal oxide contained therein. The density may be measured by helium pycnometry.

The metal oxide-polymer composite particles may be used as external additives for both conventional and chemical toners. Conventional toners can be prepared by a number of known methods, such as admixing and heating a resin, pigment particles, optional charge enhancing additives and other additives in conventional melt extrusion devices and related equipment. Conventional equipment for dry blending of powders may be used for mixing or blending the carbon black particles with the resin. Other methods include spray drying and the like. Compounding of the pigment and other ingredients with the resin is generally followed by mechanical attrition and classification to provide toner particles having a desired particle size and particle size distribution. Chemical toners, also known as chemically prepared toners, are produced in a liquid phase; the resin particles are generally formed in the presence of the colorant. For example, a process has been developed in which a polymer latex is combined with an aqueous pigment dispersion and agglomerated using a coagulant to form polymer particles. Another process involves the aqueous suspension polymerization of a dispersion of pigment in at least one monomer. Also, a pigment/polyester resin dispersion has been prepared and combined with water, followed by evaporation of the solvent.

For both conventional and chemically prepared toners, the metal oxide-polymer composite particles may be combined with the toner particles in the same manner as conventional additives such as fumed metal oxides or colloidal metal oxide. For example, toner compositions can be formulated by mixing a suitable amount of the metal oxide-polymer composite particles in a blender with toner particles, which may be free of any external additives and having a suitable average diameter (e.g., about 9 µm). In certain embodiments, the metal oxide-polymer composite particles make up from about 0.5% to about 7% by weight of the toner composition, for example, from about 0.5% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5% or from about 6.5% to about 7% by weight of the toner composition. The metal oxide-polymer composite particles may be distributed on the surface of the toner particles. Preferably, surface coverage by the metal oxide-polymer composite particles is about 10% to about 90% of the toner surface.

The metal oxide-polymer composite particles preferably exhibit low levels of drop-off. While the retention of the composite particles on a toner particle depends in part on the composition of the toner, a proxy test may be used to compare the performance of metal oxide-polymer composite particles and metal oxide particles of a comparable size and shape. For example, a test similar to those described in US2003/0064310A1, US2010/0009282A1, and US2006/0240350A1 may be used. Specifically, chemical toner samples are formulated with 1-6 wt. % of the additive sample as specified in Table A and sufficient black polyester chemical toner to make an 80 g sample. In the Examples below, the toner is EUPSA6K-P100 toner from Sinonar Inc. (particle size 8-12 µm). The toner and additive are mixed, e.g., in an IKA M20 Universal Mill (IKA Works, Inc., Wilmington, N.C.) for 45 s. The mill is operated in pulse mode (e.g., three cycles of 15 s mixer on and 15 s mixer off) to keep the toner from being heated above its glass transition temperature. To perform the drop-off test, the resulting toners are placed in glass jars and rolled for 60 min at about 265 rpm on a roll mill. Three samples including 5.0 g of the toner are then mixed with a solution of 1.0 g Triton X-100 dispersant in 100 g water and stirred for 20 minutes. Additional water (up to 20-30 mL) is occasionally added to wash toner off the side of the beaker. After stirring, one of the dispersions is put aside and the other two are sonicated at 20% and 30% energy output for one minute in a Misonix XL 2020 sonicator (output power 550 W, output frequency 20 kHz). All three dispersions are then filtered to remove loose metal oxide. The filter cake is redispersed in water and then refiltered, following which the filter cake is washed with 100 mL of water to ensure removal of the dispersant. All three samples are then dried overnight at 40° C. and then for an additional hour at 70° C. The amount of additive remaining on the toner is determined using thermal gravimetric analysis (TGA). Comparison of the ash from the samples to ash resulting from TGA of bare toner allows calculation of the metal oxide remaining after the organic components burn off.

TABLE A

| Additive particle size (nm) | Additive Loading (%) | 1$^{st}$ Toner Addition (g) | Additive Addition (g) | 2$^{nd}$ Toner Addition (g) |
| --- | --- | --- | --- | --- |
| >100 | 6 | 40 | 4.8 | 35.2 |
| 40-100 | 4 | 40 | 3.2 | 36.8 |

As seen for silica in FIG. 3, metal oxide-polymer composite particles exhibit less drop off than metal oxide particles of the same size. Moreover, the improvement in drop-off performance increases with particle diameter.

The metal oxide-polymer particles preferably exhibit a level of tribocharge comparable to that of metal oxide particles having a similar size. For example, the metal oxide polymer composite particles may have a level of tribocharge within 25% of that for metal oxide particles having the same diameter. For example, the metal oxide-polymer composite particles may have a tribocharge within about 20%, within about 15%, within about 10%, or within about 5% of the tribocharge of metal oxide patticles having the same size. Tribocharge measurements can be made using suitable techniques and equipment known in the art (e.g., Vertex T-150 tribocharger).

The metal oxide-polymer composite particles should have sufficient mechanical strength to be mixed with toner particles according to methods typically used by those of skill in the art, for example, through use of a Henschel mixer or other fluidizing mixer or blender. Preferably, the metal-oxide composite particles have sufficient strength to survive collisions between toner particles (having the metal oxide-polymer composite particles distributed over the surface) during the development cycle of an electrophotographic process. The mechanical strength of the particles may be evaluated by formulating a chemical toner with the composite particles, e.g., according to the method described above in connection with Table A. The toner/particle formulation is then mixed with a carrier, e.g., silicone coated Cu—Zn ferrite carrier (60-90 µm particle size) to form a mixture with 2% (w/w) of toner. This mixture is then placed in a mixing container with a fill factor from about 70% to about 90% and tumbled in an agitator that can move the mixing container in a rhythmic, three-dimensional motion, termed a three-dimensional mixer. The mixing container is moved at a frequency from about 50 to about 70 cycles/min within a volume from about 6 to about 8 times the volume of the container. Exemplary agitators include the Turbula mixer, available from Willy A. Bachoven AG, the Inversina mixer, available from Bioengineering AG, and the dynaMix 3-dimensional mixer from Glen Mills. After a specified period of time, the samples are analyzed by SEM. In the Examples below, 40 g of carrier (silicone coated Cu—Zn ferrite carrier (60-90 lam particle size, Powdertech Co., Ltd.) was mixed with 0.8 g toner/additive formulation in a 50 mL glass jar. The jar was put in a TURBULA® T 2 F mixer (2 L capacity) manufactured by Willy A. Bachofen AG, Switzerland. In this mixer, the mixing container turns in a three-dimensional motion based on rotation, translation, and inversion and the content is subjected to an ever-changing, rhythmically pulsing motion (60 cycles/min). Small samples of the toner/carrier mixture were taken after 10, 30, and 60 min of mixing at 62 cycles/min and analyzed by SEM. If the composite particles have sufficient mechanical strength, they will not be flattened or deformed during the mixing. Any flattening or deformation will appear as a change in particle diameter in the SEM. In a preferred embodiment, the change in diameter of the metal oxide-polymer composite particles after 10 minutes of mixing is less than 25%, preferably less than 20%, for example, less than 10%. Without being bound by any particular theory, it is believed that the use of an oil-soluble initiator during production of the particles leads to more efficient polymerization. This would in turn be expected to produce a higher cross-link density and higher strength particles.

Alternatively or in addition, the metal oxide-polymer composite particles may be used as a cleaning aid. The function and method of use of cleaning aids is discussed in U.S. Pat. No. 6,311,037, the contents of which are incorporated herein by reference. Briefly, a resilient blade removes excess toner from the photoreceptor after an image is printed. Abrasive particles can facilitate more complete removal of the excess toner, which otherwise might transfer to subsequent copies, creating a "shadow" effect in which a faint image of a previous copy appears on one or more subsequent copies. In general, two different kinds of particles are currently used as cleaning aids. Pulverized or precipitated inorganic particles (e.g., metal oxides, nitrides, carbides) have appropriate hardness and shape for the abrasive cleaning application. However, they have a wide particle size distribution. Larger particles can scratch the surface of the photoreceptor and smaller particles may be smaller than the clearance between the cleaning blade and the photoreceptor. Colloidal silica has a uniform particle size but, because of its smooth surface, has limited cleaning ability. The metal oxide-polymer composite particles combine the advantages of both of these particles—they have an irregular surface punctuated by hard, abrasive metal oxide particles but also have a narrow particle size distribution. The metal oxide-polymer composite particles for use as a cleaning aid may be incorporated in the toner formulation or may be contained in a separate reservoir from which they are delivered to a drum of the photocopier in the vicinity of the cleaning blade.

The metal oxide-polymer composite particles are preferably in the form of a powder. Preferably, they exhibit a low moisture content after equilibration at 50% relative humidity and 25° C. at about 1 atm pressure, for example, less than about 10% moisture by weight, for example, from about 0% to about 3%, from about 1% to about 4%, from about 3% to about 5%, from about 5% to about 7%, or from about 7% to about 10% moisture. Moisture content may be measured by drying 100 mg samples in a glass vial in an oven at 125° C. for 30 min, discharging them (e.g., by briefly holding them under the Haug One-Point-Ionizer (Haug North America, Williamsville, N.Y.)), and then loading the samples into an instrument that will measure the mass of the samples after incubation for 20 min at selected relative humidity values between 0 and 95%.

The present invention will be further clarified by the following examples which are intended to be only exemplary in nature

EXAMPLES

Example 1

Synthesis of Composite Particles Using Ludox AS-40 Silica, $M_{MPS}/M_{silica}=2.2$, no pH Adjustment A 250 mL four neck round bottom flask equipped with an overhead stirring motor, condenser, and thermocouple was charged with 18.7 g of Ludox AS-40 colloidal silica dispersion (W.R. Grace & Co.) (20-30 nm particle size, BET SA 126 m$^2$/g, pH 9.1, concentration of silica 40 wt %), 125 mL of DI water, and 16.5 g (0.066 mol) of methacryloxypropyltrimethoxysilane (Gelest, Inc., further abbreviated as MPS, CAS#2530-85-0, Mw=248.3). In this example, the mass ratio $M_{MPS}/M_{silica}$ was 2.2. The temperature was increased to 65° C., and the mixture was stirred at 120 rpm. Nitrogen gas was bubbled through the mixture for 30 min. After 3 h, 0.16 g (~1 wt % of MPS) of 2,2'-azobisisobutyronitrile (further abbreviated as AIBN, CAS#78-67-1, Mw=164.2) radical initiator dissolved in 10 mL of ethanol was added and the temperature was increased to 75° C. Radical polymerization was allowed to proceed for 5 h, after which 3 mL (2.3 g, 0.014 mol) of 1,1,1,3,3,3-hexamethylsisilazane (HMDZ) was added to the mixture. The reaction was allowed to proceed for another 3 h. The final mixture was filtered through a 170 mesh sieve to remove the coagulum and the dispersion dried in a Pyrex tray overnight at 120° C. A white powdery solid was collected the next day and milled using an IKA M20 Universal mill. A transmission electron micrograph (TEM micrograph) of this material is shown in FIG. 1.

Examples 2 and 3

Figure 2:
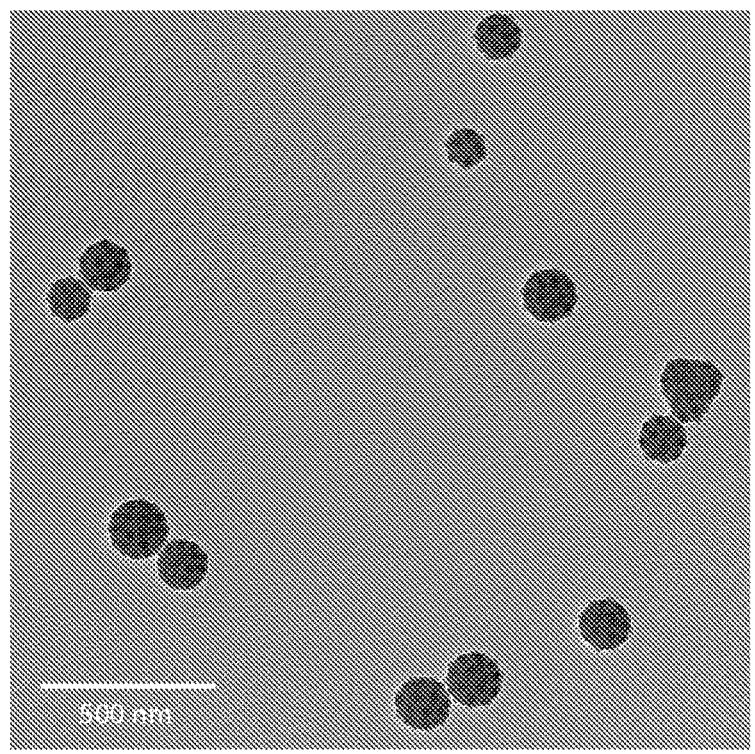

Synthesis of Composite Particles Using Ludox AS-40 Silica, $M_{MPS}/M_{silica}$=5.0 and 7.5, no pH Adjustments Composite particles were prepared following the procedure in Example 1, except that 7.5 g (Example 2) and 4.7 g (Example 3) of Ludox AS-40 silica were used, resulting in $M_{MPS}/M_{silica}$ ratios of 5.0 and 7.5, respectively. A transmission electron micrograph (TEM micrograph) of the Example 2 material is shown in FIG. 2.

Example 4

Characterization of Composite Particles

Particle size distributions for the composite particles of Examples 1-3 dispersed in THF were measured by dynamic light scattering using a Nanotrac™ 252 particle size analyzer. The results are summarized in Table 1 below. The data demonstrate that the average particle size increases with the increase in $M_{MPS}/M_{silica}$ ratio.

TABLE 1

| Example | $M_{MPS}/M_{silica}$ | $d_{10}$ (nm) | $d_{50}$ (nm) | $d_{90}$ (nm) | $M_v$ (nm) |
|---|---|---|---|---|---|
| 1 | 2.2 | 72 | 123 | 229 | 144 |
| 2 | 5.0 | 95 | 176 | 318 | 193 |
| 3 | 7.5 | 123 | 194 | 331 | 212 |

The silica content in the composite particles of Examples 1-3 was determined by TGA. The results are summarized in Table 2 below. The data demonstrate that silica content in the composite particles steadily decreases with the increase in $M_{MPS}/M_{silica}$ ratio.

TABLE 2

| Example | $M_{MPS}/M_{silica}$ | Silica content (wt %) |
|---|---|---|
| 1 | 2.2 | 57.8 |
| 2 | 5.0 | 46.1 |
| 3 | 7.5 | 42.5 |

Example 5

Drop-Off Test

The drop off test described above was performed for the composite particles produced in Examples 1-3 using EUPSA6K-P100 polyester toner from Sinonar according to the method described above in connection with Table A. The results were compared with the results of drop off tests performed in the same manner for 115 nm and 300 nm spherical colloidal silicas treated with HMDZ and 200 nm non-spherical colloidal silica also treated with HMDZ. Treatment of colloidal silica with HMDZ was performed according to the protocol described in U.S. Pat. No. 7,811,540B2. Briefly, hydrophobic silica particles samples A, B, and C were prepared from the commercially available hydrophilic colloidal silica dispersions indicated in Table 3. Isopropanol co-solvent and hexamethyldisilazane (HMDZ) were added to each of the colloidal silica dispersions in a 1 L flask fitted with an overhead agitator, thermocouple, and condenser, as indicated in Table 4. The mixtures were stirred rapidly at a rate that the vortex of the dispersion extended at least to the top of the agitation blade. Stirring at this rate was continued for the duration of the reaction time. After allowing each dispersion to react for 5-6 hours at 65-70° C., each dispersion was poured into a Pyrex tray and dried in a forced-air oven at 120° C. overnight. The final product was milled with IKA M20 Universal mill and tested for carbon content.

TABLE 3

| Sample | Type of silica, source | Particle size (nm) $d10, d50, d90, Mv$ | Shape |
|---|---|---|---|
| A | MP104, 40 wt % silica, Nissan Chemical | 83, 103, 130, 107 | Spherical |
| B | PL-10H, 24 wt % silica, Fuso Chemical | 128, 194, 284, 202 | Non-spherical |
| C | PL-30H, 30 wt % silica, Fuso Chemical | 223, 304, 401, 309 | Spherical |

TABLE 4

| Sample | Amount of silica dispersion (g) | Amount of IPA (g) | Amount of HMDZ (g) | wt % C |
|---|---|---|---|---|
| A | 450 | 150 | 43 | 0.70 |
| B | 450 | 190 | 25 | 0.60 |
| C | 450 | 120 | 13 | 0.27 |

Figure 3A:
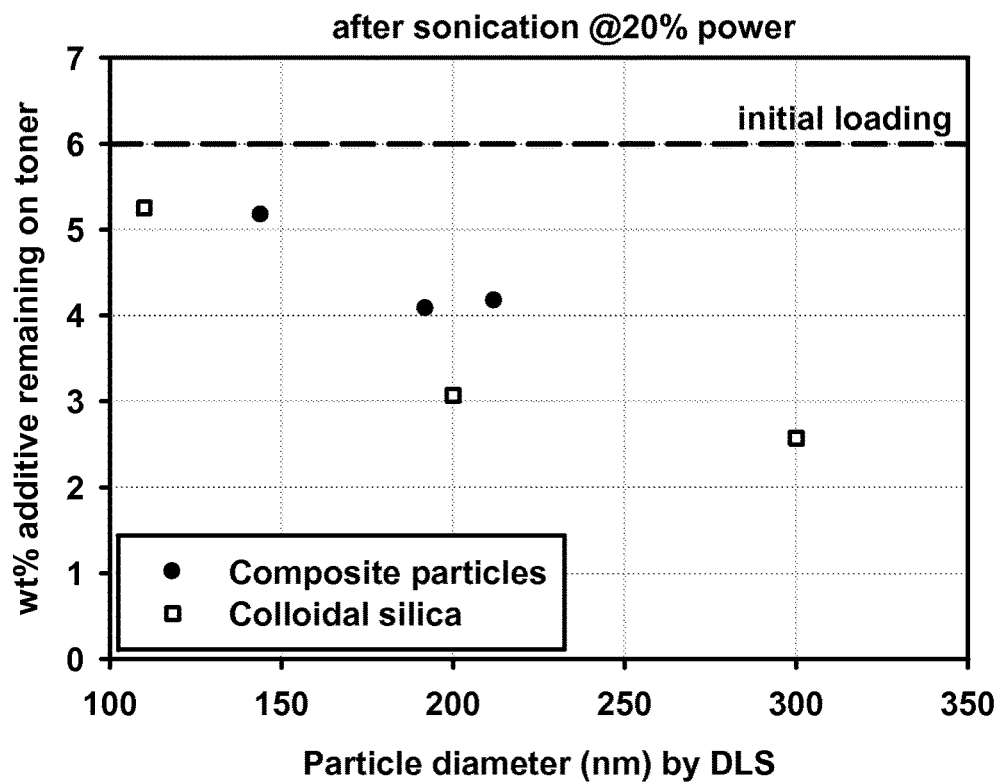
FIGS. 3A and 3B illustrate the amount of additive prepared according to an exemplary embodiment of the invention remaining on a proxy toner formulation after sonication at 20% power (FIG. 1A) and 30% power (FIG. 1B).
Figure 3B:
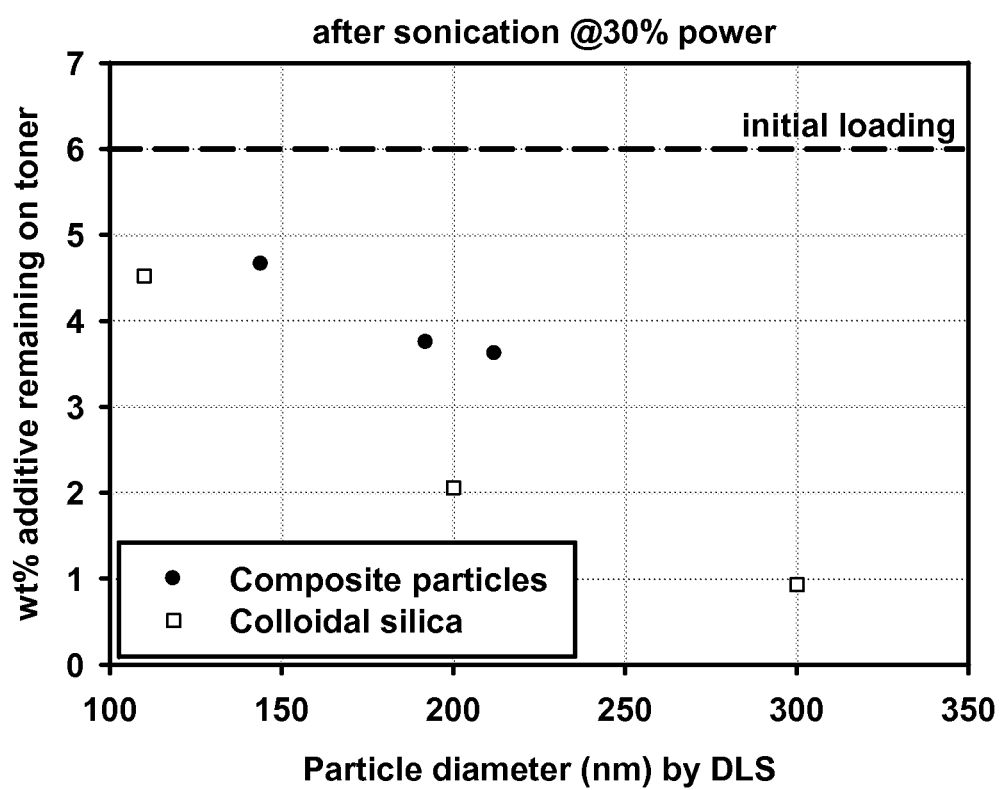

Results of the drop-off test are summarized in FIGS. 3A and 3B. The results demonstrate that after sonication at 20 and 30% power, composite particles (circles) drop off less than similar size colloidal silica treated with HMDZ (squares). The drop off increases with particle size from 115 nm to 300 nm and with the increase in sonication energy from 20 to 30% power.

Example 6

Tribocharge Measurements

The tribocharge behavior of model toners formulated with the composite particles from Examples 1-3 and the 115 nm, and 200 nm colloidal silica samples described in Example 5 was measured according to the following procedure: Developers were prepared by mixing 2 wt. % of formulated toner (i.e., EUPSA6K-P100 polyester toner and additive milled as described above) with a silicone resin coated Cu—Zn ferrite carrier (60-90 μm particle size, purchased from Powdertech Co., Ltd.). Developers were conditioned overnight in temperature and humidity controlled chamber at 15% RH/18° C. (LL condition) or 80% RH/30° C. (HH condition).

After conditioning, the developers were placed in glass jars and charged by rolling for 30 min at 185 rpm on a roll mill. The triboelectrostatic charge measurements were done using a Vertex T-150 tribocharge tester, manufactured by Vertex Image Products, Inc., Yukon, Pa. The sample was placed inside a Faraday cage and a high pressure air jet was used to blow off the toner from the carrier. The carrier retained the opposing charge of the toner particles. The results are summarized in Table 5 below.

TABLE 5

| Sample | Particle size ($M_v$ in nm) | HH (µC/g) | LL (µC/g) |
|---|---|---|---|
| 1 | 144 | −19 ± 1 | −34 ± 1 |
| 2 | 193 | −12 ± 1 | −35 ± 1 |
| 3 | 212 | −10 ± 1 | −34 ± 2 |
| Colloidal silica (spherical) | 115 | −20 ± 1 | −28 ± 2 |
| Colloidal silica (non-spherical) | 200 | −28 ± 1 | −39 ± 2 |

The data in the table demonstrate that nano-composite particles have triboelectrostatic charge similar to the triboelectrostatic charge colloidal silica particles treated with HMDZ.

Example 7

Synthesis of Composite Particles Using ST-O40 Silica, $M_{MPS}/M_{silica}=2.2$, pH 8.5

Figure 4:
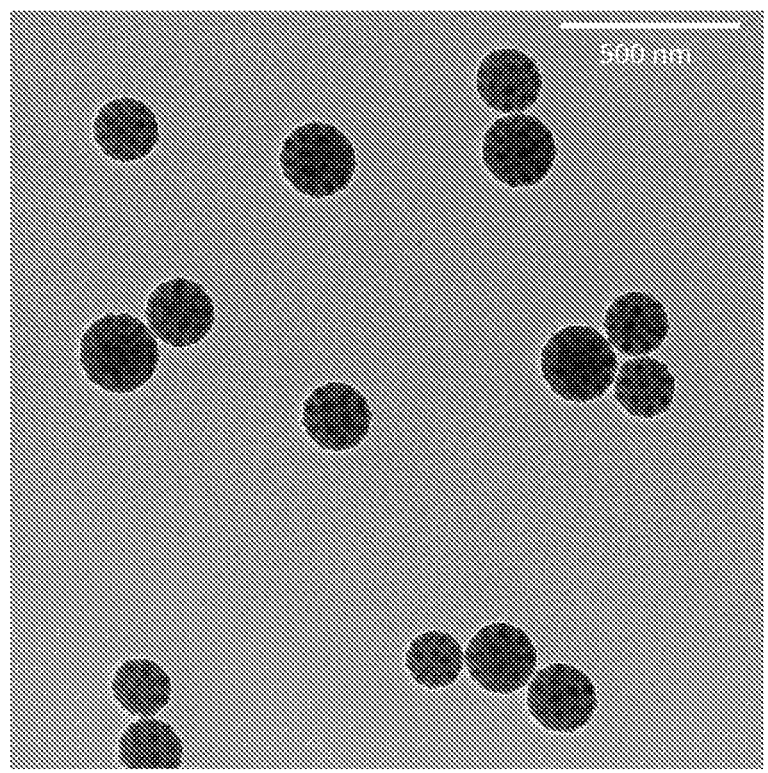
FIGS. 4-6 are transmission electron micrographs of metal oxide-polymer composite particles produced according to an embodiment of the invention.

Composite particles were prepared following the procedure described in Example 1. A 250 mL four neck round bottom flask equipped with an overhead stirring motor, condenser, and thermocouple was charged with 18.7 g of ST-O40 dispersion of colloidal silica (Nissan Chemical, 20-30 nm particle size, BET SA 128 m²/g, pH 2-3, concentration of silica 40 wt %), 125 mL of DI water. The pH of the dispersion was adjusted to 8.5 by adding few drops of 1.0 N solution of $NH_4OH$, following which 16.5 g (0.066 mol) of MPS was added. In this example, the mass ratio $M_{MPS}/M_{silica}$ was 2.2. The temperature was increased to 65° C., and the mixture was stirred at a rate of 120 rpm. After 3 h, the temperature was increased to 75° C. and nitrogen gas bubbled through the mixture for 30 min. 0.16 g (~1 wt % of the weight of MPS) of AIBN radical initiator dissolved in 10 mL of ethanol was added to the mixture. Radical polymerization was allowed to proceed for 5 h, after which the mixture was filtered through a 170 mesh sieve to remove the coagulum. The dispersion was dried in a Pyrex tray overnight at 120° C. A white dry powdery solid was collected the next day and milled using an IKA M20 Universal mill. A TEM micrograph of this material is shown in FIG. 4.

Example 8

Synthesis of Composite Particles Using ST-O40 Silica, $M_{MPS}/M_{silica}=5$, pH 8.5

Figure 5:
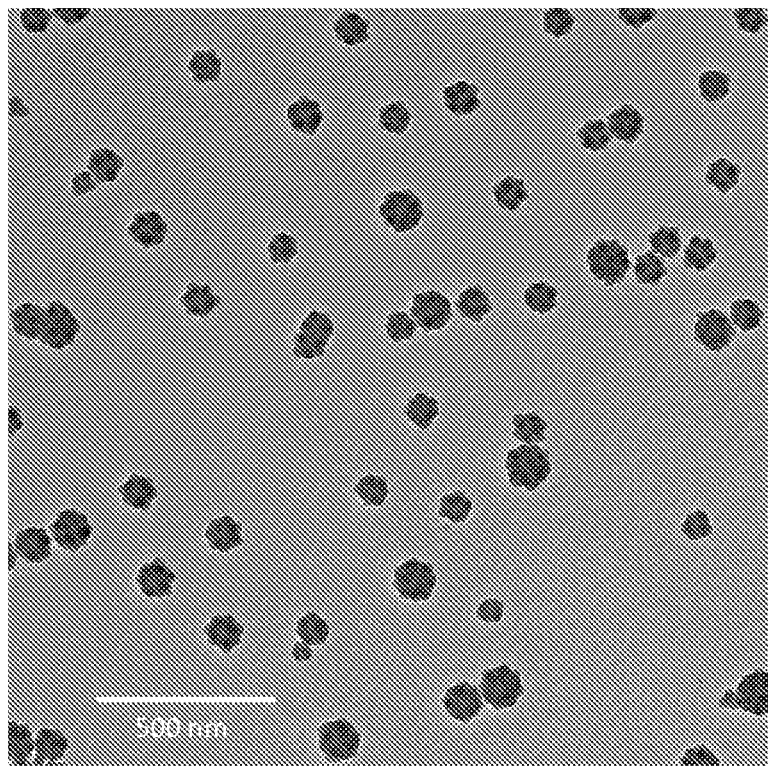

In this example, the ratio $M_{MPS}/M_{silica}$ was 5. The synthesis procedure was similar to that in Example 7, except that 8.3 g of ST-O40 colloidal silica dispersion was used. A TEM micrograph of this material is shown in FIG. 5.

Example 9

Synthesis of Composite Particles Using Titanium Dioxide

A 250 mL round bottom flask equipped with an overhead stirring motor, condenser, and thermocouple is charged with 30 g of titanium (IV) oxide nanopowder (specific surface area 200 m2/g, particle size<25 nm, available from Sigma-Aldrich) and 150 mL of DI water. The pH of the dispersion is adjusted to 8.5 by adding few drops of solution of concentrated ammonium hydroxide in water. The dispersion is sonicated for 10 min at 30% sonicator power to ensure complete dispersion of titanium oxide. 20 g (0.08 mol) of methacryloxypropyltrimethoxysilane is added (further abbreviated as MPS, CAS#2530-85-0, Mw=248.3); the temperature is increased to 65° C. and the mixture stirred at the rate of 100 rpm. Nitrogen gas is bubbled through the mixture for 30 min. After 3 h, 0.2 g of 2,2′-azobisisobutyronitrile (AIBN, CAS#78-67-1, Mw=164.2) radical initiator dissolved in 10 mL of ethanol is added and the temperature increased to 75° C. Radical polymerization is allowed to proceed for 5 h. The final mixture is filtered through 170 mesh sieve to remove the coagulum, and then the dispersion is dried in a Pyrex tray overnight at 120° C. A white powdery solid is collected the next day and milled using an IKA M20 Universal mill.

Example 9a Synthesis of Composite Particles Using Colloidal Silica and Titania

Figure 8:
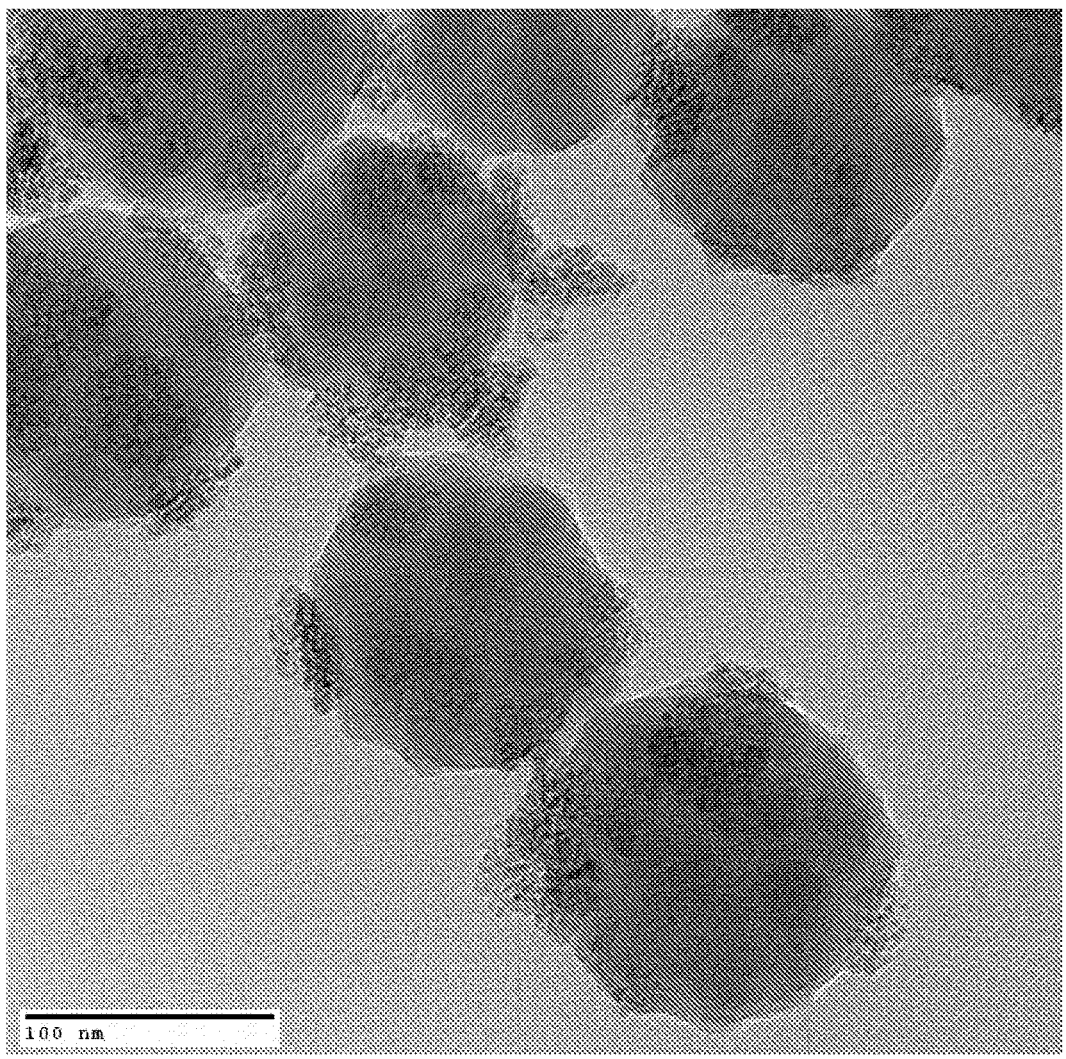
FIG. 8 is a transmission electron micrograph of metal oxide-polymer composite particles produced according to an embodiment of the invention.

A 500 mL four neck round bottom flask equipped with an overhead stirring motor, condenser, and thermocouple was charged with 20.0 g of Snowtex-O40 colloidal silica dispersion (product of Nissan Chemical Inc., 20-30 nm particle size, BET SA 128 m²/g, pH 2-3, concentration of silica 40 wt %) and 250 mL of DI water. The pH of the mixture was adjusted to 9.0 using a concentrated solution of ammonium hydroxide in water. 32.0 g (0.129 mol) of MPS (CAS#2530-85-0, Mw=248.3) was added and temperature was increased to 65° C. The mixture was allowed to stir with the rate of 120 rpm for 2 h. In a separate beaker 25.0 g of Cristal ACTiV™ S5-300B sol of $TiO_2$ in water (manufactured by Millennium Inorganic Chemicals, concentration of $TiO_2$ 17.5 wt %, particle size 30-50 nm) was diluted with 50 mL of DI water and added to the reaction mixture drop-wise. The reaction continued for another 30 min at 65° C., after which 0.64 g of AIBN (CAS#78-67-1, Mw=164.2) radical initiator dissolved in approximately 20 mL of ethanol was added and the temperature was increased to 75° C. Radical polymerization was allowed to proceed for 2 h, after which 2 g (0.012 mol) of 1,1,1,3,3,3-hexamethyldisilazane (HMDZ, CAS#999-97-3, $M_w$=161.4) and 2 g (0.007 mol) of octyltriethoxysilane (OTES, CAS#2943-75-1, $M_w$=276.5) were added. The reaction was allowed to continue for another 3 h. The final mixture was filtered through a 170 mesh sieve to remove the coagulum and the dispersion dried in a Pyrex tray overnight at 120° C. A white powdery solid was collected the next day and milled using an IKA M20 Universal mill. TEM images of the prepared particles are shown in FIG. 8. The particle size distribution for the milled solid was measured by dynamic light scattering using a Nanotrac™ 252 instrument. The sample was prepared as a dispersion in 2-butanone (1-3 wt %) d10=98 nm, d50=166 nm, d90=262 nm.

Example 10

Figure 6:
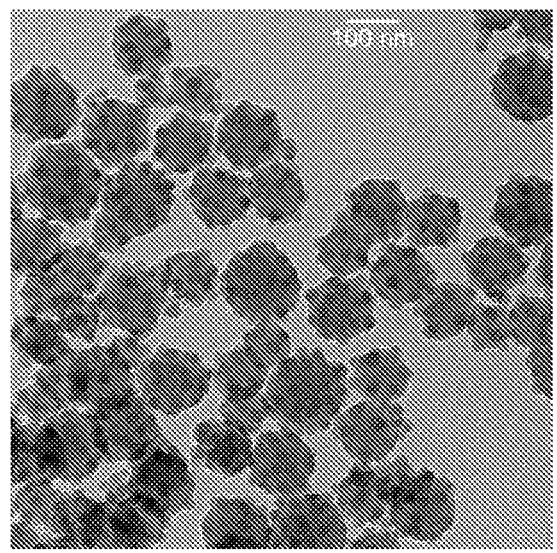

Synthesis of Composite Particles Using Colloidal Silica, MPS and Styrene as Co-Monomer A 500 mL three neck round bottom flask equipped with an overhead stirring motor, condenser, and thermocouple was charged with 12.6 g of Ludox AS-40 colloidal silica dispersion and 200 mL of DI water. MPS, 14.3 g (0.058 mol), was mixed with 4.3 g (0.041 mol) of styrene and added to the Ludox dispersion drop-wise. The mixture was stirred at 25° C. for 22 hrs. The temperature was increased to 75° C., and nitrogen gas was bubbled through the mixture for 30 min AIBN, 700 mg (0.004 mol), dissolved in 10 mL of isopropanol was then added to the reaction mixture. Radical polymerization was allowed to proceed for 6 h, after which 150 ml of isopropanol and 1.1 g (0.0067 mol) of HMDZ dissolved in 2 ml IPA were added to the mixture. The reaction was allowed to proceed for another 5 h. The final dispersion was dried in a Pyrex tray overnight at 110° C. A white powdery solid was collected the next day and milled using an IKA M20 Universal mill. A TEM image of the material is shown in FIG. 6. Tribocharge was measured as described in Example 6 except that the toner was formulated using EUHP25K polyester toner from Sinonar, Inc.; the ratio of the tribocharge at HH and LL conditions was 0.57.

Example 11

Aqueous Adsorption Isotherms of Silica-Polymer Composite Particles

Figure 7:
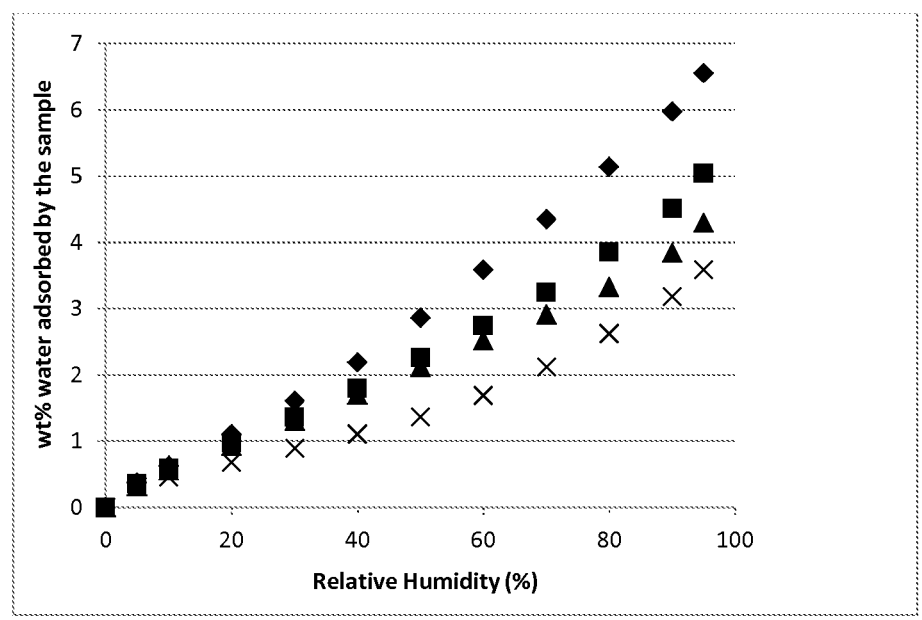
FIG. 7 is a graph illustrating the moisture adsorption isotherm of metal oxide-polymer composite particles produced according to an embodiment of the invention.

Water adsorption isotherms for composite particles produced according to Examples 2, 7, 8, and 10, were measured at 25° C. using a dynamic vapor sorption balance from Surface Measurement Systems, Inc. 100 mg samples were dried in a glass vial in an oven at 125° C. for 30 min before the analysis. The dried samples were loaded into the instrument immediately after briefly holding them under the Haug One-Point-Ionizer (Haug North America, Williamsville, N.Y.). Data were collected after incubation for 20 min at selected relative humidity values between 0 and 95%. The results are shown in FIG. 7 (squares—Example 2; triangles—Example 7; diamonds—Example 8; x=Example 10). The results show relatively good adoration performance all the samples exhibited less than 3 weight percent water adsorption at 50% relative humidity.

Examples 12 and 13

Figure 9:
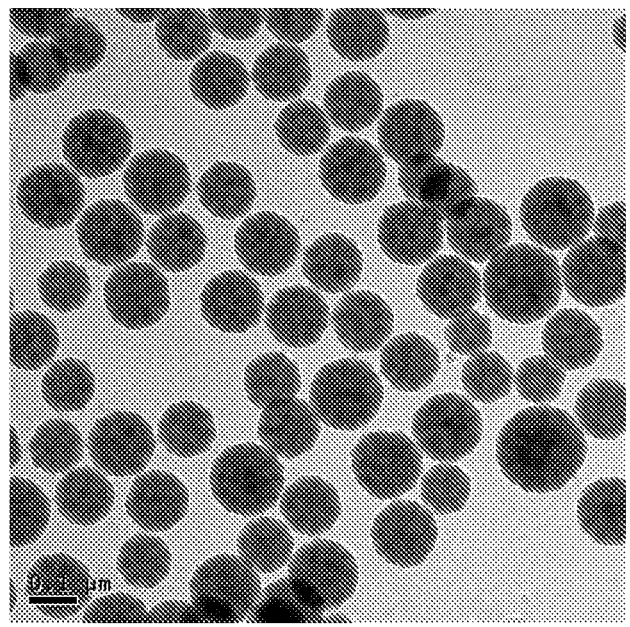
FIGS. 9-13 are transmission electron micrographs of metal oxide-polymer composite particles produced according to various embodiments of the invention.
Figure 10:
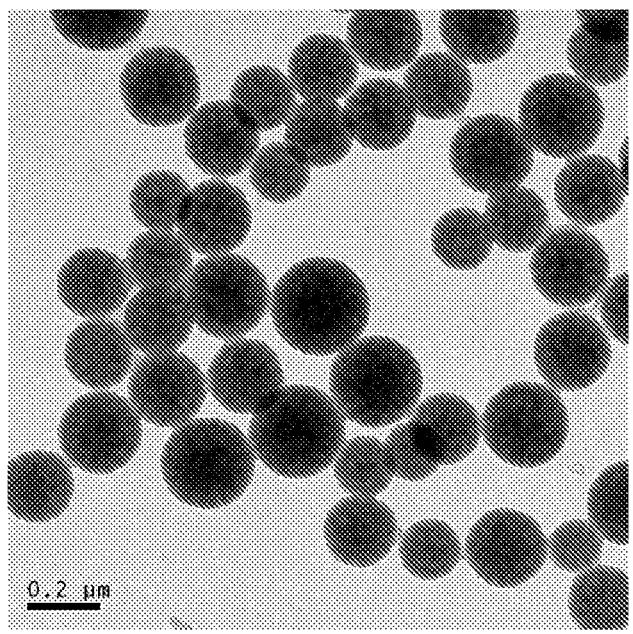

Preparation of Composite Particles Using Colloidal Silica, MPS, and Methyl Methacrylate as Co-Monomer A 250 mL four neck round bottom flask equipped with an overhead stirring motor, condenser, and thermocouple was charged with 4 g of Ludox AS40 colloidal silica and 125 mL of DI water, followed by 2.5 g of MPS and 1 g of methyl methacrylate (MMA) (Aldrich). In this example, the mass ratio $M_{monomer}/M_{silica}$ was 2.2, with MMA being 29 wt % of the monomer. The reactants (monomer+silica) made up 3.9 wt % of the dispersion. The temperature was increased to 60° C., and the mixture was stirred at a rate of 250 rpm. After 2 h, the temperature was increased to 75° C. and nitrogen gas bubbled through the mixture for 30 min. 0.06 g (~1.8 wt % of the weight of monomer) of AIBN radical initiator dissolved in 10 mL of ethanol was added to the mixture. Radical polymerization was allowed to proceed for 3 h, after which the mixture was filtered through glass wool to remove the coagulum. The dispersion was dried overnight at 120° C. The resulting white dry powdery solid was milled using an IKA M20 Universal mill. A TEM micrograph of this material is shown in FIG. 9. The procedure was repeated with 6.2 g Ludox AS40 colloidal silica dispersion, 2 g MMA, 5 g MPS, and 0.09 g AIBN ($M_{monomer}/M_{silica}$=2.2, reactants=7.2 wt %). A TEM micrograph of this material is shown in FIG. 10.

Examples 14 and 15

Figure 11:
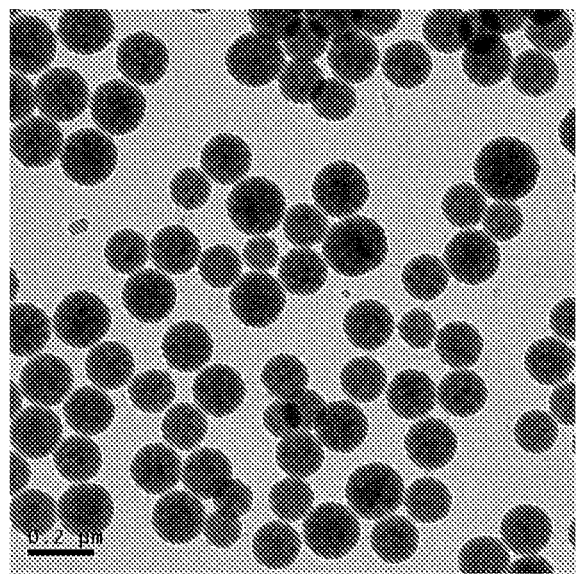
Figure 12:
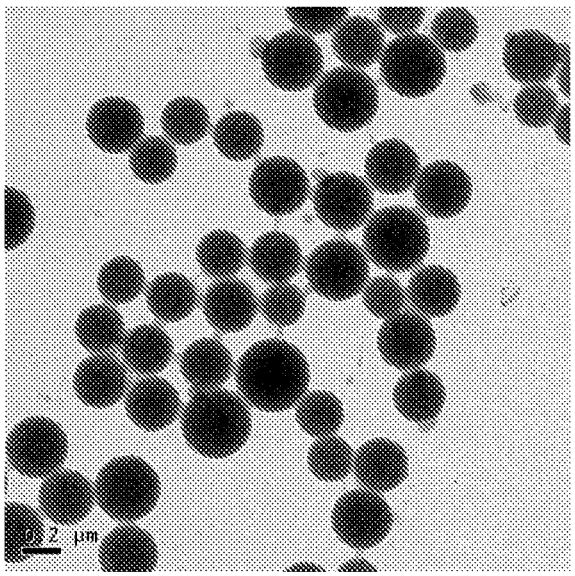

Preparation of Composite Particles Using Colloidal Silica, MPS, and Hydroxypropyl Methacrylate as Co-Monomer Particles were produced according to the method of Examples 12 and 13 using hydroxypropyl methacrylate (Aldrich) as co-monomer instead of MMA. TEM micrographs of these materials are shown in FIGS. 11 (reactants=3.9 wt %) and 12 (reactants=7.2 wt %).

Example 16

Figure 13:
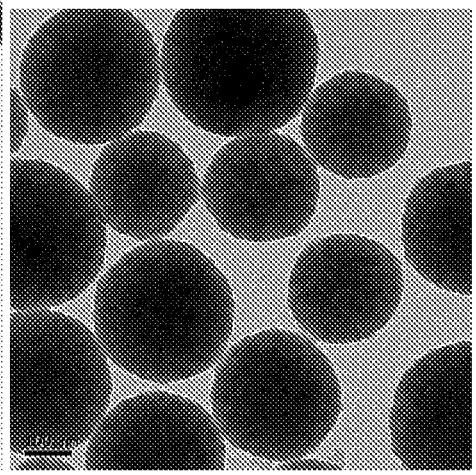

Preparation of Composite Particles Using Colloidal Silica, MPS, and Trifluoroethyl Methacrylate as Co-Monomer Particles were produced according to the method of Example 12 using 11.5 g Ludox AS40 dispersion, 7.2 g MPS, 2.9 g trifluoroethyl methacrylate (Aldrich) in place of MMA, and 0.18 g AIBN. Radical polymerization was allowed to proceed for 3.5 hours. TEM micrographs of these materials are shown in FIG. 13.

Example 17

Preparation of Composite Particles Using Colloidal Silica and MPS (MPS/Silica=1.5)

A 250 mL four neck round bottom flask equipped with an overhead stirring motor, condenser, and thermocouple was charged with 6.2 g of Ludox AS40 colloidal silica and 50 mL of DI water, followed by 3.7 g of MPS. The temperature was increased to 60° C., and the mixture was stirred at a rate of 250 rpm. After 2.5 h, the temperature was increased to 75° C. and nitrogen gas bubbled through the mixture for 30 min. 0.07 g wt % of the weight of monomer) of AIBN radical initiator dissolved in 3 mL of ethanol was added to the mixture. Radical polymerization was allowed to proceed overnight, after which the mixture was filtered through glass wool to remove the coagulum. The dispersion was dried overnight at 120° C. The resulting white dry powdery solid was milled using an IKA M20 Universal mill. TEM and SEM micrographs of this material are shown in FIG. 14.

Example 18

Mechanical Stability of Composite Particles

Figure 15B:
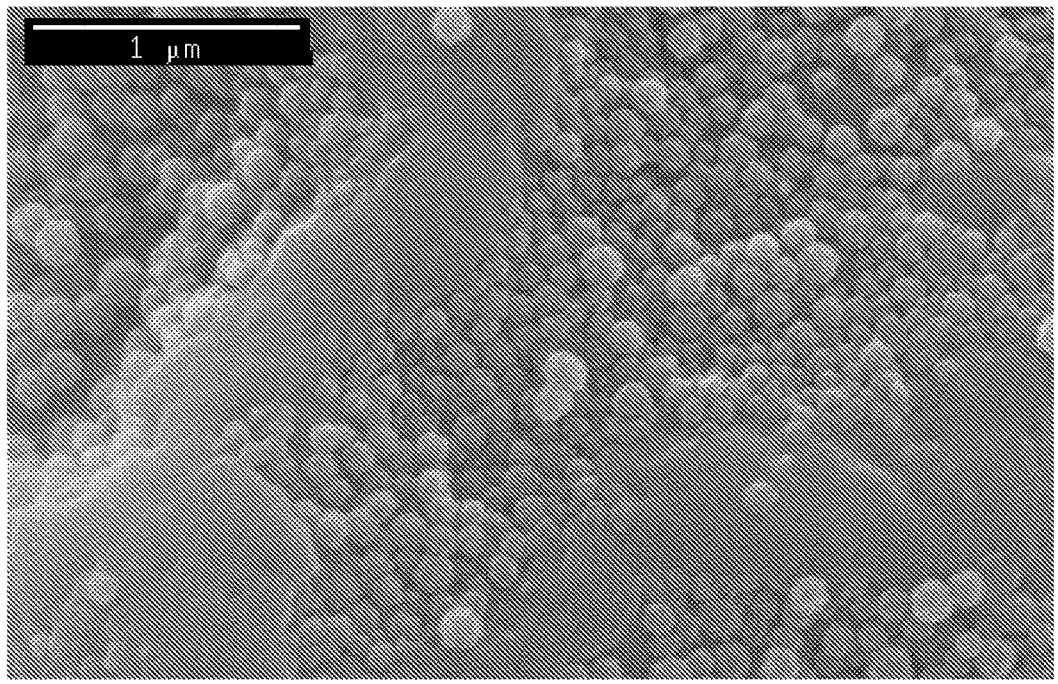
FIGS. 15A and B are scanning electron micrographs of toner formulated using the metal oxide-polymer composite particles of Example 1 before (A) and after (B) being shaken with a Cu—Zn carrier for 30 min.
Figure 16A:
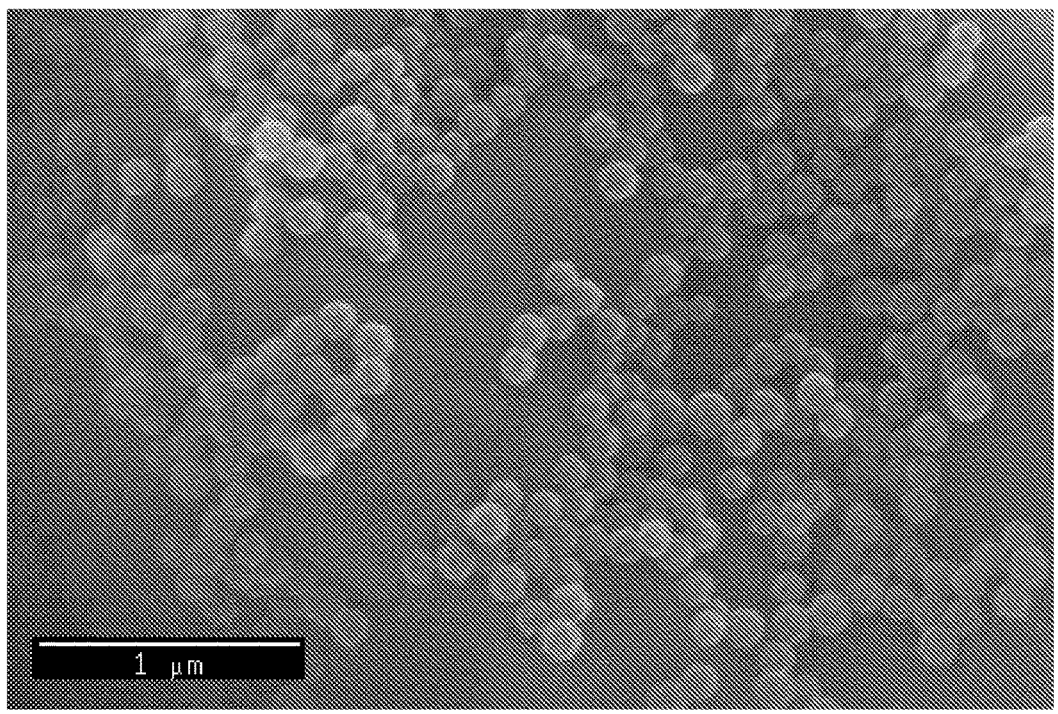
FIGS. 16A and B are scanning electron micrographs of toner formulated using the metal oxide-polymer composite particles of Example 2 before (A) and after (B) being shaken with a Cu—Zn carrier for 30 min.
Figure 16B:
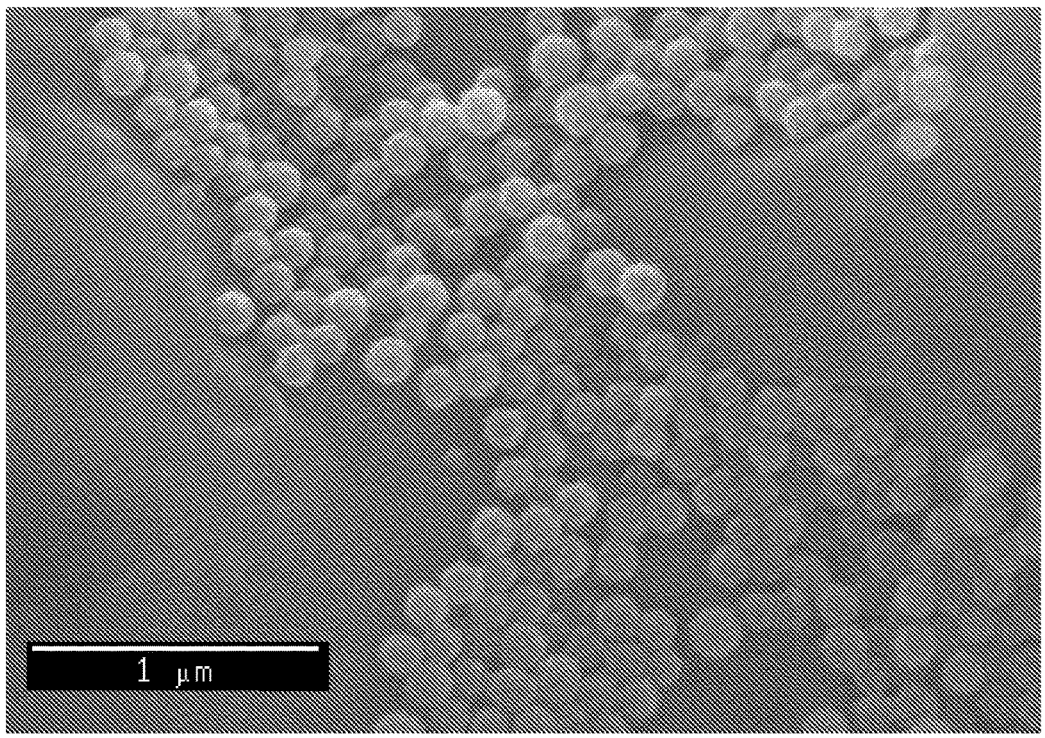

Composite particles prepared according to the method of Examples 1 and 2 were formulated with toner as described above in connection with Table A. 40 g of Cu—Zn ferrite carrier (60-90 μm particle size, purchased from Powdertech Co., Ltd.) was mixed with 0.8 g of the toner/particle formulation in a 50 mL glass jar. The jar was put in a TURBULA® T 2 F mixer manufactured by Willy A. Bachofen AG, Switzerland and agitated in a three-dimensional motion at 101 cycles/min for 30 min. SEM micrographs of the toner before and after shaking are in FIGS. 15 and 16. Manual particle size analysis gave the following results

TABLE 6

| Sample | Mean diameter (μm) | StdDev | Count |
|---|---|---|---|
| Example 1 - before shaking | 0.11 | .024 | 62 |
| Example 1 - after shaking | 0.12 | .022 | 62 |
| Example 2 - before shaking | 0.13 | .017 | 62 |
| Example 2 - after shaking | 0.14 | .024 | 63 |

The results show that any diameter increase resulting from crushing of the particles was not statistically significant.

Example 19

Preparation of Composite Particles Using MPS, Styrene, Silanol-Terminated Siloxane Polymer, and Colloidal Silica A four neck round bottom flask equipped with an overhead stirring motor, condenser, and thermocouple was charged with 50 g of Ludox AS-40 colloidal silica dispersion, 800 mL of DI water, 100 mL of isopropyl alcohol, 57 g of MPS, 11.5 g of styrene, and 11.5 g of silanol-terminated polydimethylsiloxane (S12 from Gelest, Inc., molecular weight 400-700, viscosity 16-32 cSt). In this example, the mass ratio $M_{monomer}/M_{silica}$ was 4. The temperature was raised to 35° C., and the mixture was stirred for 3.5 hours. Nitrogen gas was bubbled through the mixture for the last 30 min. 1.2 g AIBN dissolved in 5 mL acetone was added and the temperature was increased to 65-70° C. Radical polymerization was allowed to proceed for 3 h under nitrogen. The composite particles flocculated during polymerization. Particle residue was separated on a Buchner funnel with a paper filter and dried in a Pyrex tray overnight in a vacuum oven at 70° C. The resulting powder was dispersed in methyl ethyl ketone and analyzed using the Nanotrac™ 252 particle size analyzer; the average particle size was 160 nm.

Examples 20-22

Roughness And Hydrophobicity of Composite Particles

Three samples of metal oxide-polymer composite particles were prepared as follows. A 500 mL four neck round bottom flask equipped with an overhead stirring motor, condenser, and thermocouple was charged with 40.0 g of Snowtex-O40 colloidal silica dispersion (product of Nissan Chemical Inc., 20-30 nm particle size, BET SA 128 m²/g, pH 2-3, concentration of silica 40 wt %) and 320 mL of DI water. The pH of the mixture was adjusted to 8.5 (Example 20), 9.0 (Example 21), or 9.5 (Example 22) using a concentrated solution of ammonium hydroxide in water (Table 1), and then the temperature was raised to 50° C. 35.2 g of (0.142 mol) of MPS (CAS#2530-85-0, Mw=248.3) was added to the mixture. In all experiments described in this example, the mass ratio $M_{MPS}/M_{silica}$ was 2.2. The mixture was stirred at 120 rpm and after a certain time period (pH=8.5 and 9.5: 1.5 hours, pH=9.0: 2 hours), 0.53 g of AIBN (CAS#78-67-1, Mw=164.2) radical initiator dissolved in 15 mL of ethanol was added and the temperature was increased to 75° C. Radical polymerization was allowed to proceed for 1 h, after which 5.3 g (0.033 mol) of 1,1,1,3,3,3-hexamethylsisilazane (HMDZ) was added to the mixture. The reaction was allowed to proceed for another 3 h. The final mixture was filtered through a 170 mesh sieve to remove the coagulum and the dispersion dried in a Pyrex tray overnight at 120° C. A white powdery solid was collected the next day and milled using an IKA M20 Universal mill.

Multiple TEM images for all three examples were collected and analyzed using the ImagePro software package from Media Cybernetics, Inc. The particle roughness and relative trough area were calculated as described above and are listed in Table 7.

TABLE 7

| Example | Roughness | Relative Trough Area |
|---|---|---|
| 20 | 1.2 +/- 0.1 | 0.02 +/- 0.02 |
| 21 | 1.3 +/- 0.3 | 0.03 +/- 0.03 |
| 22 | 1.4 +/- 0.1 | 0.06 +/- 0.02 |

Comparative Example A

Preparation of Composite Particles Using Colloidal Silica and Polystyrene

Composite particles were prepared using the methods of Schmid, et al., *Macromolecules*, 2009, 42:3721-3728. Specifically, a round-bottom flask containing a magnetic stir bar was charged with 20 g Bindzil CC40 colloidal silica dispersion (Eka Chemicals, 40 wt % silica) and 376 g water, followed by 50 g styrene (Aldrich). The mixture was degassed via five cycles of evacuation and nitrogen purging and then heated to 60° C. A solution was prepared with 0.5 g 2,2'-azobis(isobutyramidine) dihydrochloride (AIBA) initiator in 40 g water and then added to the reaction solution. Polymerization was allowed to proceed for 24 hours. The resulting dispersion was purified by repeated cycles of centrifugation and redispersion (5000-7000 rpm for 30 min). The supernatant was decanted and replaced with DI water after each cycle. This was repeated until TEM confirmed the absence of excess silica sol. The final mixture was filtered to remove the coagulum and the dispersion dried in a Pyrex tray overnight at 110° C. A white powdery solid was collected the next day and milled using an IKA M20 Universal mill.

Comparative Example B

Mechanical Stability of PS/Silica Composite Particles

Figure 17A:
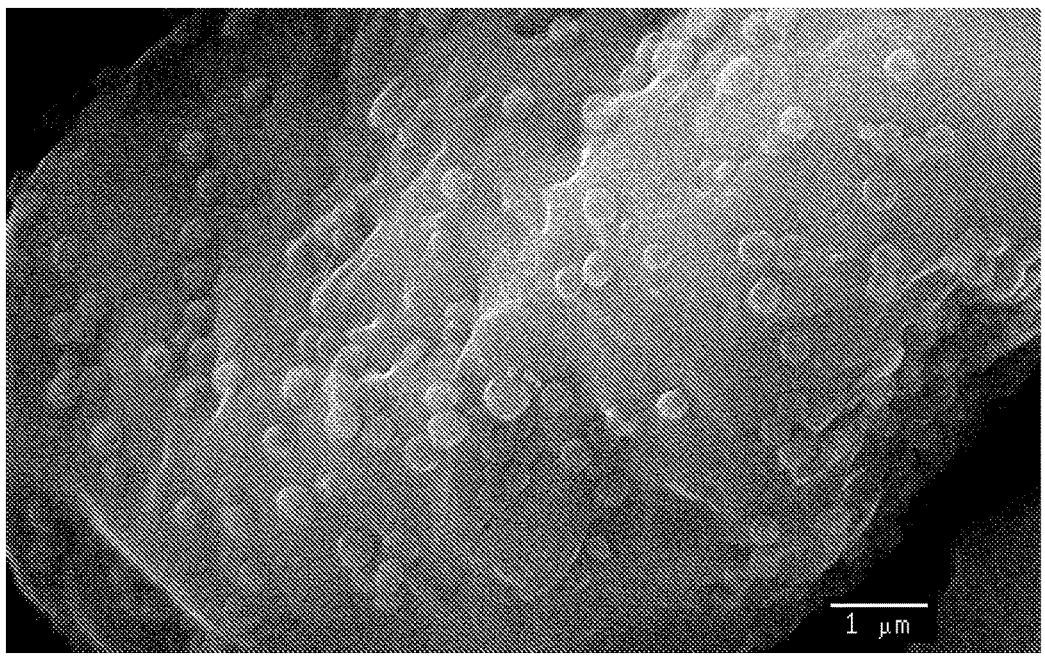
FIGS. 17A and B are scanning electron micrographs of toner formulated with metal oxide-polymer composite particles produced using a prior art method before (A) and after (B) being shaken with a Cu—Zn carrier for 10 minutes.
Figure 17B:
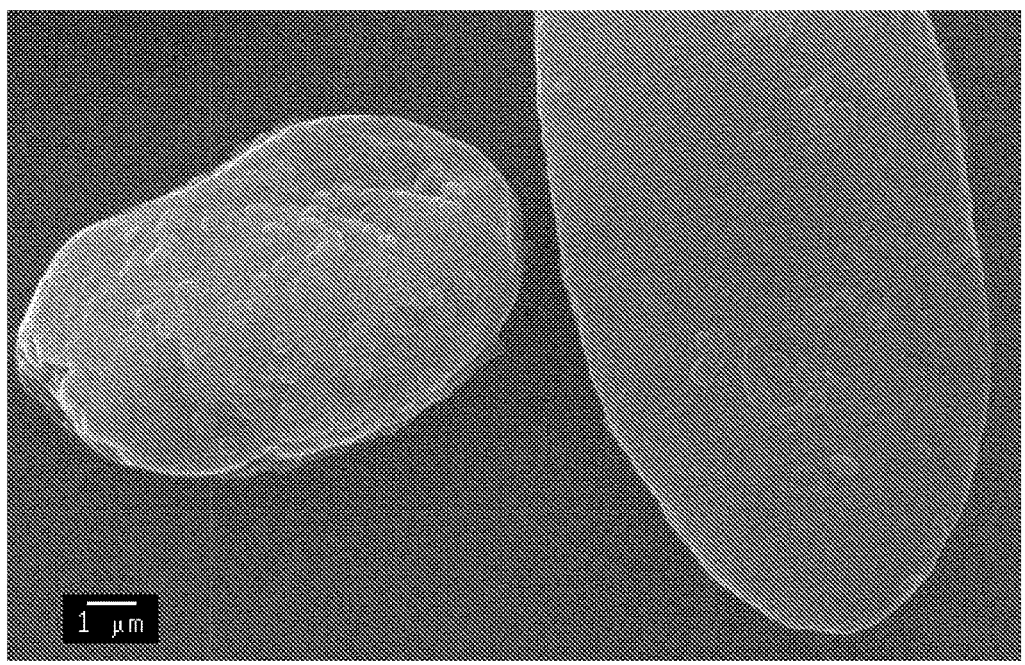

The composite particles of Comparative Example A were formulated with toner as described above in connection with Table A. 40 g of Cu—Zn ferrite carrier (60-90 μm particle size, purchased from Powdertech Co., Ltd.) was mixed with 0.8 g of toner/particle formulation in a 50 mL glass jar. The jar was put in a TURBULA® T 2 F mixer manufactured by Willy A. Bachofen AG, Switzerland and agitated in a three-dimensional motion at 101 cycles/min. SEM micrographs taken after 10 minutes of shaking show that the particles are clearly dramatically deformed (FIG. 17). Manual particle size analysis gave the following results:

TABLE 8

| Sample | Mean diameter (μm) | StdDev | Count |
|---|---|---|---|
| Before shaking | 0.34 | .051 | 76 |
| After shaking | 0.51 | .11 | 63 |

The results show that the 50% diameter increase resulting from crushing of the particles was statistically significant. Such particles are not desirable for use as external additives for toner because the crushed particles are less able to separate the toner particles from one another. Furthermore, these particles are also less desirable as cleaning aids because their resilience reduces their effectiveness as abrasive particles. In contrast, when the particles of Examples 1 and 2 are formulated with toner and carrier and agitated in the same manner for 30 minutes, the change in the mean diameter of the particles is not statistically significant (Table 9).

TABLE 9

| Sample | Mean diameter (μm) | StdDev | Count |
| --- | --- | --- | --- |
| Example 1: Before shaking | 0.11 | .02 | 62 |
| Example 1: After shaking | 0.12 | .02 | 62 |
| Example 2: Before shaking | 0.13 | .02 | 62 |
| Example 2: After shaking | 0.14 | .02 | 63 |

Comparative Example C

Preparation and Hydrophobization of Composite Particles

Composite particles were prepared according to the method of Comparative Example A, using 20 g Bindzil 2040 in 200 g water, 24.75 g 2-vinyl pyridine (Aldrich), 24.75 g methyl methacrylate (Aldrich), 0.5 g divinyl benzene (Aldrich), and 0.5 g AIBA in 50 g water. Before drying, 4.8 g hexamethyldisilazane (Gelest) was added to the dispersion of composite particles and the reaction allowed to proceed for four hours at 75° C. The final mixture was filtered to remove the coagulum and the dispersion dried in a Pyrex tray overnight at 110° C. However, the particles melted during drying rather than forming a powder.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A toner composition comprising toner particles mixed with a powder comprising metal oxide-polymer composite particles comprising metal oxide particles and a polymer matrix, wherein:

the metal oxide particles are surface-modified with a first hydrophobizing agent via which the metal oxide particles are covalently attached to the polymer matrix, and a portion of the metal oxide particles project into and out from the polymer matrix, wherein the polymer matrix comprises a polymer or copolymer of the first hydrophobizing agent, and the first hydrophobizing agent has the formula $[R^3_{3-x}(OR^1)_x]SiR^2Q$, where x is 1, 2, or 3 $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10.

2. The toner composition of claim 1, wherein the surface of the metal oxide particles is modified with a second hydrophobizing agent, wherein the second hydrophobizing agent is selected from silazane compounds, siloxane compounds, silane compounds, and silicone fluids having a number average molecular weight of at most 500.

3. The toner composition of claim 1, wherein the metal oxide-polymer composite particles are treated with a third hydrophobizing agent, wherein the third hydrophobizing agent is an alkylhalosilane or a silicone fluid having a number average molecular weight greater than 500.

4. The toner composition of claim 1, wherein the polymer comprises polymers of styrene, unsubstituted or substituted acrylates or methacrylates, olefins, vinyl esters, and acrylonitrile and copolymers and mixtures of the above.

5. The toner composition of claim 1, wherein when the metal oxide-polymer composite particles are combined with polyester chemical toner particles having a particle size from 8-12 μm to form a toner having 4 wt % metal oxide-polymer composite particles and the toner combined with silicone coated Cu—Zn ferrite carrier having a particle size from 60-90 μm to form a mixture having 2 wt % toner and the mixture agitated rhythmically in a container with a fill factor from about 70% to about 90% in a three-dimensional mixer within a volume about 6 to about 8 times the volume of the container for 10 minutes at a frequency from about 50 to about 70 cycles/min, their diameter increases by less than 25%.

6. The toner composition of claim 1, wherein the moisture content of the metal oxide-polymer composite particles is from 0 wt % to about 10 wt % when measured after equilibration at 50% relative humidity and 25° C. at about 1 atm pressure.

7. A toner composition comprising toner particles mixed with a powder comprising metal oxide-polymer composite particles comprising metal oxide particles and a polymer matrix, wherein:

the metal oxide particles are surface-modified with a first hydrophobizing agent via which the metal oxide particles are covalently attached to the polymer matrix and wherein at least a portion of the surface of the metal oxide-polymer composite particles is modified with a second hydrophobizing agent, wherein the polymer of the polymer matrix is a polymer or co-polymer of the first hydrophobizing agent, wherein the first hydrophobizing agent has the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10.

8. The toner composition of claim 7, wherein a portion of the metal oxide particles are partially or fully embedded within the polymer portion of the metal oxide-polymer composite particles.

9. The toner composition of claim 7, wherein the metal oxide-polymer composite particles have an average roughness $P^2/4\pi S$ from 1 to about 3, where P is a perimeter of a cross-section of a metal oxide-polymer composite particle and S is the cross-sectional area of the particle and where both P and S are determined from transmission electron micrographs.

\* \* \* \* \*